US010286658B2

(12) United States Patent
Hanagami et al.

(10) Patent No.: US 10,286,658 B2
(45) Date of Patent: May 14, 2019

(54) FLOW PATH MEMBER, LIQUID EJECTING HEAD, AND LIQUID EJECTING APPARATUS

(71) Applicant: SEIKO EPSON CORPORATION, Tokyo (JP)

(72) Inventors: Taiki Hanagami, Matsumoto (JP); Isamu Togashi, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/909,581

(22) Filed: Mar. 1, 2018

(65) Prior Publication Data

US 2018/0257372 A1  Sep. 13, 2018

(30) Foreign Application Priority Data

Mar. 9, 2017  (JP) .................... 2017-045393

(51) Int. Cl.
| B41J 2/14 | (2006.01) |
| B41J 2/175 | (2006.01) |
| F16K 7/16 | (2006.01) |
| B05B 12/08 | (2006.01) |

(52) U.S. Cl.
CPC ............. B41J 2/14 (2013.01); B41J 2/17596 (2013.01); F16K 7/16 (2013.01); B05B 12/088 (2013.01)

(58) Field of Classification Search
CPC ....... B41J 2/14; B41J 2/17596; B05K 12/088; F16K 7/16
See application file for complete search history.

(56) References Cited

U.S. PATENT DOCUMENTS 9,346,281 B2 * 5/2016 Okuno ................ B41J 2/17596
2015/0108257 A1   4/2015 Okui

FOREIGN PATENT DOCUMENTS

JP   2015-077747 A   4/2015

* cited by examiner

Primary Examiner — Sharon A. Polk
(74) Attorney, Agent, or Firm — Workman Nydegger

(57) ABSTRACT

A flow path member includes a film, a main body that includes a recess portion that is closed by the film, a first opening and a second opening that are provided in the recess portion and used to supply and emit a liquid, and a wall which is provided in the recess portion. The film and the wall are configured to switch between contact and non-contact between the film and the main body according as the film displaces. In a first direction, the wall is provided around the first opening, the wall has a first slit in one of two portions of the wall across the first opening from each other and a second slit in the other one of the two portions, and the second opening is outside the wall. An opening area of the first slit is larger than an opening area of the second slit.

17 Claims, 11 Drawing Sheets

FLOW PATH MEMBER, LIQUID EJECTING HEAD, AND LIQUID EJECTING APPARATUS

BACKGROUND

1. Technical Field

The present invention relates to a flow path member that has a flow path that is closed by a film, a liquid ejecting head that includes the flow path member, and a liquid ejecting apparatus that includes the flow path member.

2. Related Art

A flow path member in which a flow path is formed by closing a surface of a recess portion provided on a main body with a flexible film is known. Examples of such flow path members include a valve device, such as a self-sealing valve, that is used in liquid ejecting apparatuses represented by an ink jet type recording apparatus.

Such a valve device is provided in an intermediate portion of a flow path that supplies a liquid, such as an ink, from a storage unit that stores the liquid to a liquid ejecting head that ejects the liquid so that the valve device adjusts the supply pressure of the liquid by closing and opening the flow path. When the pressure on the downstream side of the valve device is negative (relative to the atmosphere pressure), the pressure difference between the inside of the recess portion and the outside of the film flexuously deforms the film so that the valve body is operated to open the valve device, thus allowing the liquid to be supplied from the upstream side to the downstream side.

The recess portion is provided with a first opening and a second opening through which the liquid enters and leaves the recess portion. Since the liquid supplied into the recess portion tends to flow along a shortest distance line between the first opening and the second opening, there arises a problem that the liquid resides in other regions in the recess portion.

Therefore, a configuration of such a recess portion in which a wall is provided around the first opening, the second opening is provided outside the wall, a slit is provided at the opposite side of the first opening to the second opening so as to form flow of the liquid in a direction opposite to the direction of flow from the first opening to the second opening and therefore inhibit residence of the liquid has been disclosed (see, e.g., JP-A-2015-077747).

However, this has a problem that gas bubbles in the liquid attach to the inner side of the wall, resulting in a decline in the bubble emission characteristic. In particular, in a configuration in which a slit is provided only in a vertically lower portion of the wall, bubbles, ascending by buoyancy, are likely to attach to the wall.

The attachment of bubbles to the wall or the growth of bubbles on the wall changes the behavior of the film, giving rise to a problem of the film becoming unable to stably operate. A further problem is that a bubble grows and moves to the downstream side at an unexpected timing, causing a defective condition at the downstream side. For example, in a liquid ejecting head represented by an ink jet type recording head, a bubble moving to the downstream side causes a droplet discharge failure. Furthermore, in order to force out bubbles, a cleaning operation of expelling bubbles together with the liquid needs to be performed, resulting in an increased amount of undesirable consumption of the liquid.

Note that this problem occurs not only in flow path members used in the liquid ejecting heads represented by ink jet type recording heads but also in flow path members used in other devices in similar manners.

SUMMARY

An advantage of some aspects of the invention is provision of a flow path member, a liquid ejecting head, and a liquid ejecting apparatus that have improved capability of stirring a liquid and improved capability of emitting bubbles.

A first aspect of the invention provides a flow path member that includes a film, a main body that includes a recess portion that is closed by the film, a first opening and a second opening that are provided in the recess portion and that are used to supply and emit a liquid, and a wall which is provided in the recess portion, wherein the film and the wall are configured to switch between contact and non-contact between the film and the main body according as the film displace. In a view taken in a first direction that is a stacking direction of the main body and the film, the wall is provided around the first opening, the wall has a first slit in one of two portions of the wall across the first opening from each other and a second slit in the other one of the two portions of the wall, and the second opening is outside the wall. An opening area of the first slit is larger than an opening area of the second slit.

According to this aspect of the invention, by adjusting the placement of the flow path member relative to the vertical direction, the liquid can be caused to flow through the entire interior of the recess portion via the first slit and therefore produce stirring so as to reduce stagnation of the liquid and inhibit sedimentation of undesired matters and components contained in the liquid. Furthermore, the provision of the second slit as well as the first slit adds to passageways extending inside and outside the wall, so that bubbles contained in the liquid can be moved to the inside or the outside of the wall. In particular, even when bubbles contained in the liquid move against the flow passing through the first slit, such bubbles can be emitted through the second slit, which is provided across the first opening from the first slit, so that the bubble emission characteristic will improve. Furthermore, in another placement of the flow path member relative to the vertical direction, the function of the first slit and the function of the second slit described above can be interchanged.

The foregoing flow path member according to the invention may further include a pressure receiving plate that is fixed to the film and that includes a spring retainer and, of two substantially opposite side surfaces of the spring retainer in a radial direction of a spring that is held by the spring retainer, one side surface may contact the spring and the other side surface may be an inclined surface. According to this embodiment, the provision of the film with the pressure receiving plate can stabilize the posture of the film. Furthermore, since the pressure receiving plate is provided with the spring retainer, the shifting of the spring can be inhibited and, at the same time, the breakage of the film by the spring directly contacting the film can be inhibited. Still further, since the foregoing other surface of the spring retainer is an inclined surface, the liquid does not easily stagnate on the other surface side of the spring retainer and the bubble emission characteristic improves. In particular, when the wall and the pressure receiving plate are in contact with each other, the other surface, which is inclined, inhibits stagnation of flow of the liquid between the wall and the spring retainer and therefore inhibits bubbles in the liquid from residing inside the wall. Thus, the bubble emission characteristic improves.

The flow path member according to according to the first aspect of the invention may further include a pressure receiving plate that is fixed to the film and at least one of the pressure receiving plate and the main body may have a spring retainer and a groove that divides the spring retainer. Furthermore, in a view taken in the first direction, the groove may be provided at a second slit side of the first opening. According to this embodiment, the liquid supplied into the spring retainer is supplied to the second slit side via the groove. Alternatively, the liquid supplied through the second slit is supplied into the spring retainer via the groove. Therefore, bubbles can be inhibited from being caught inside the spring retainer and bubbles can be moved to the inside or the outside of the spring retainer and the wall via the groove and the second slit. Thus, the bubble emission characteristic improves.

In the foregoing flow path member according to the first aspect of the invention, the wall may have, between the first slit and the second slit in a view taken in the first direction, a slit that has a smaller opening area than the first slit. According to this embodiment, the provision of one or more slits adds to passageways that connect the inside and the outside of the wall, so that the bubble emission characteristic will improve.

A second aspect of the invention provides a liquid ejecting head that include any one of the flow path members described above.

According to the second aspect of the invention, a liquid ejecting head that inhibits residence of the liquid so as to improve the bubble emission characteristic, stabilize the liquid droplet discharge characteristic, and reduce undesirable consumption of the liquid can be realized.

A third aspect of the invention provides a liquid ejecting apparatus that includes any one of the flow path members described above.

According to the third aspect of the invention, a liquid ejecting apparatus inhibits residence of the liquid so as to improve the bubble emission characteristic, stabilize the liquid droplet discharge characteristic, and reduce undesirable consumption of the liquid can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
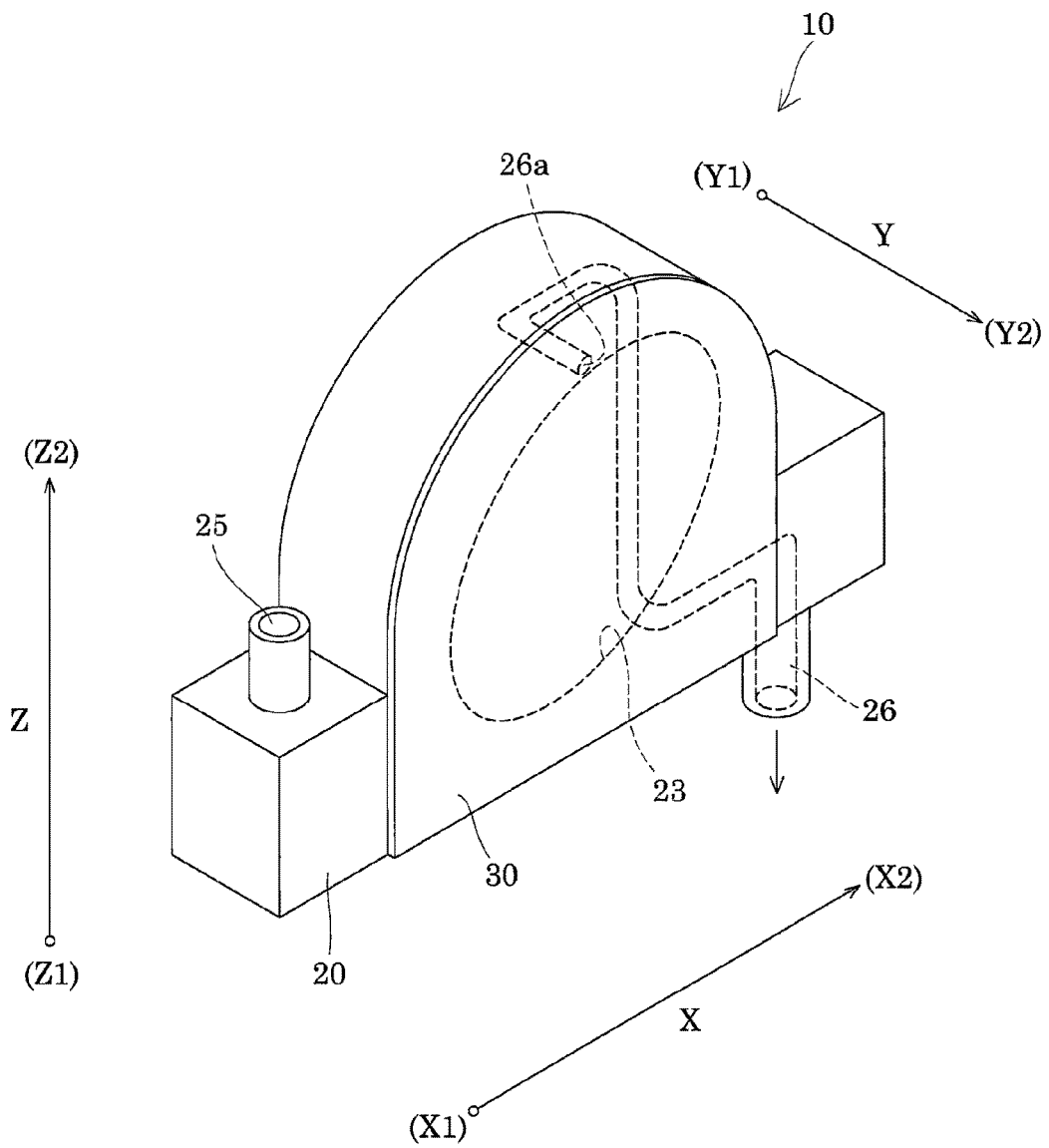
FIG. 1 is a perspective view of a valve device according to Exemplary Embodiment 1 of the invention.

Exemplary embodiments of the invention will be described hereinafter with reference to the accompanying drawings. Note that the following description illustrates mere example forms of the invention which are arbitrarily changeable within the scope of the invention. In the drawings, like reference characters represent like members whose redundant descriptions will be appropriately omitted. Furthermore, in the drawings, X, Y, and Z represent three spatial axes orthogonal to one another. In this specification, directions along these axes are referred to as a first direction X, a second direction Y, and a third direction Z. The third direction Z is a vertical direction, and a lower side and an upper side in the vertical direction are referred to as a Z1 side and a Z2 side, respectively.

Exemplary Embodiment 1

Figure 2:
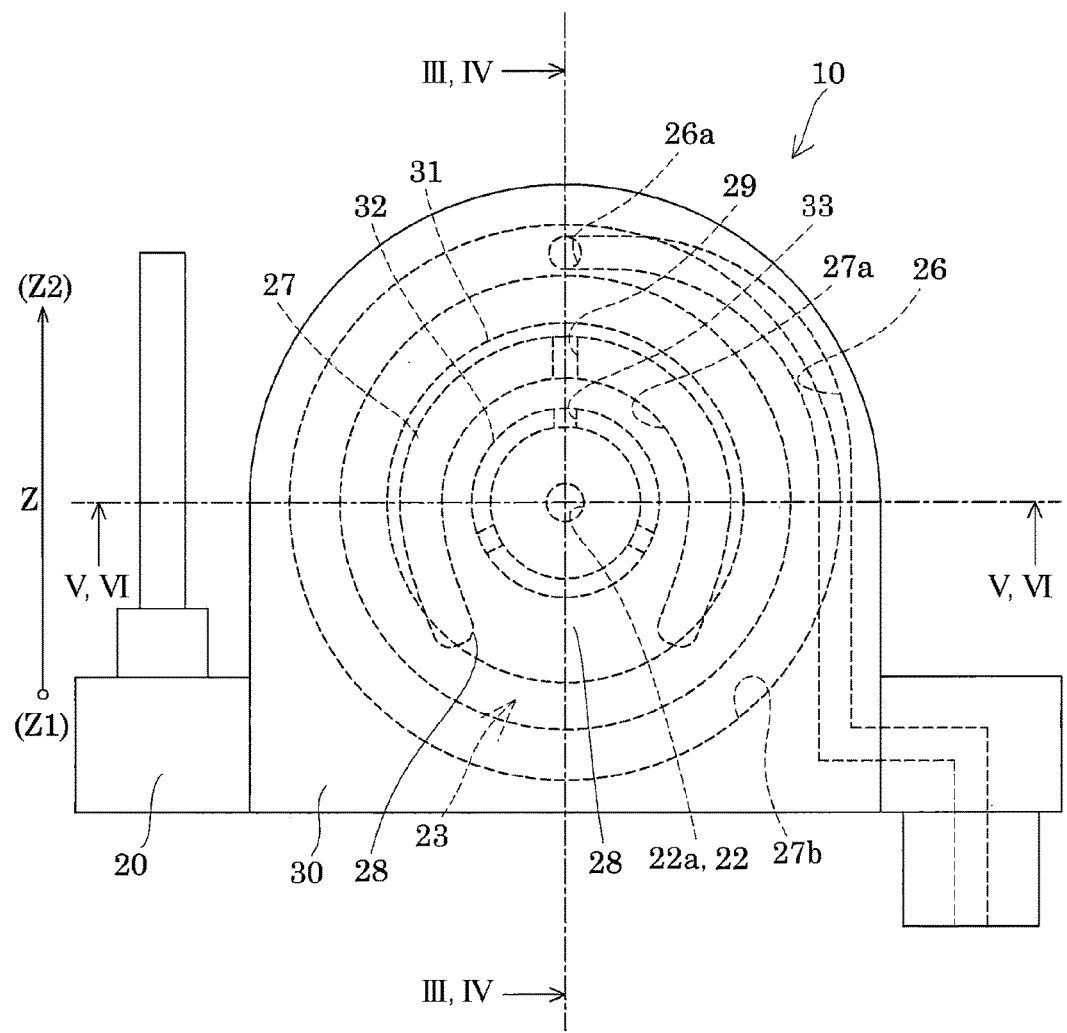
FIG. 2 is a plan view of the valve device according to Exemplary Embodiment 1 of the invention.
Figure 3:
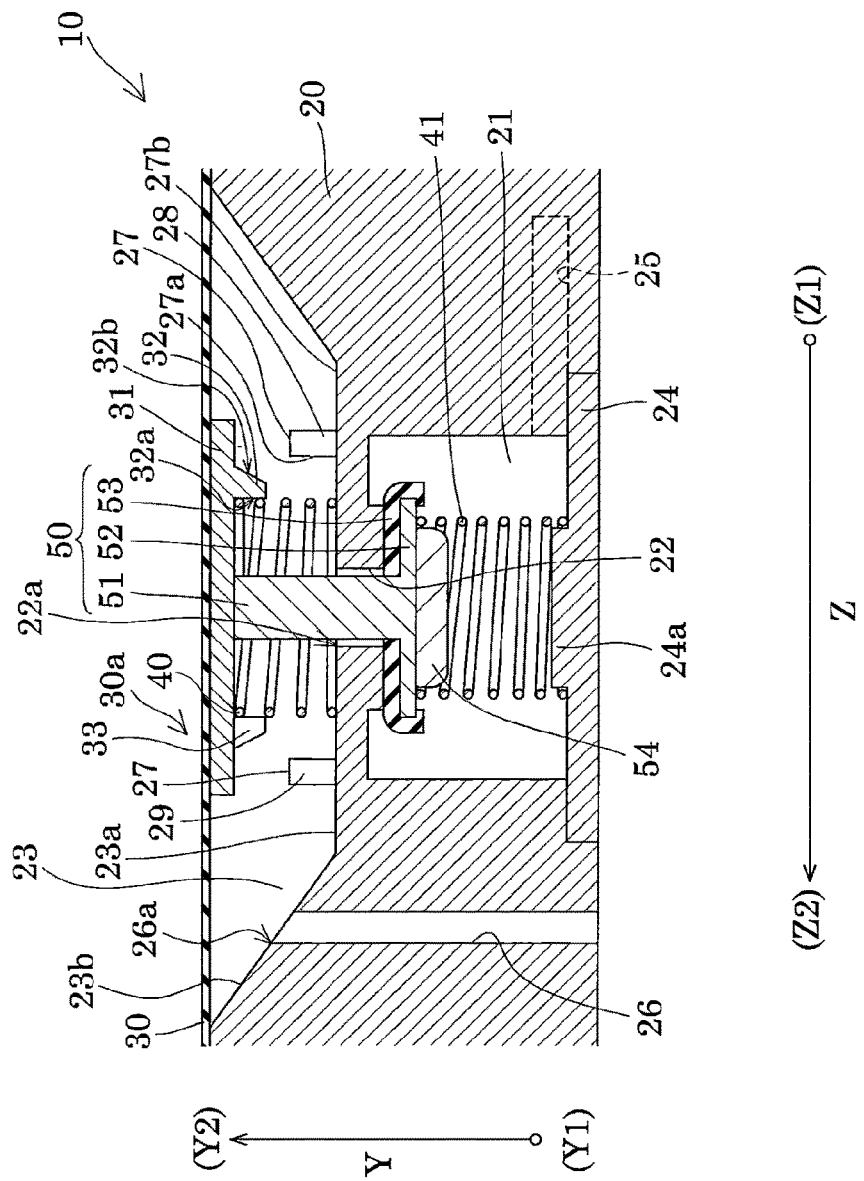
FIG. 3 is a sectional view of the valve device according to Exemplary Embodiment 1 of the invention.
Figure 4:
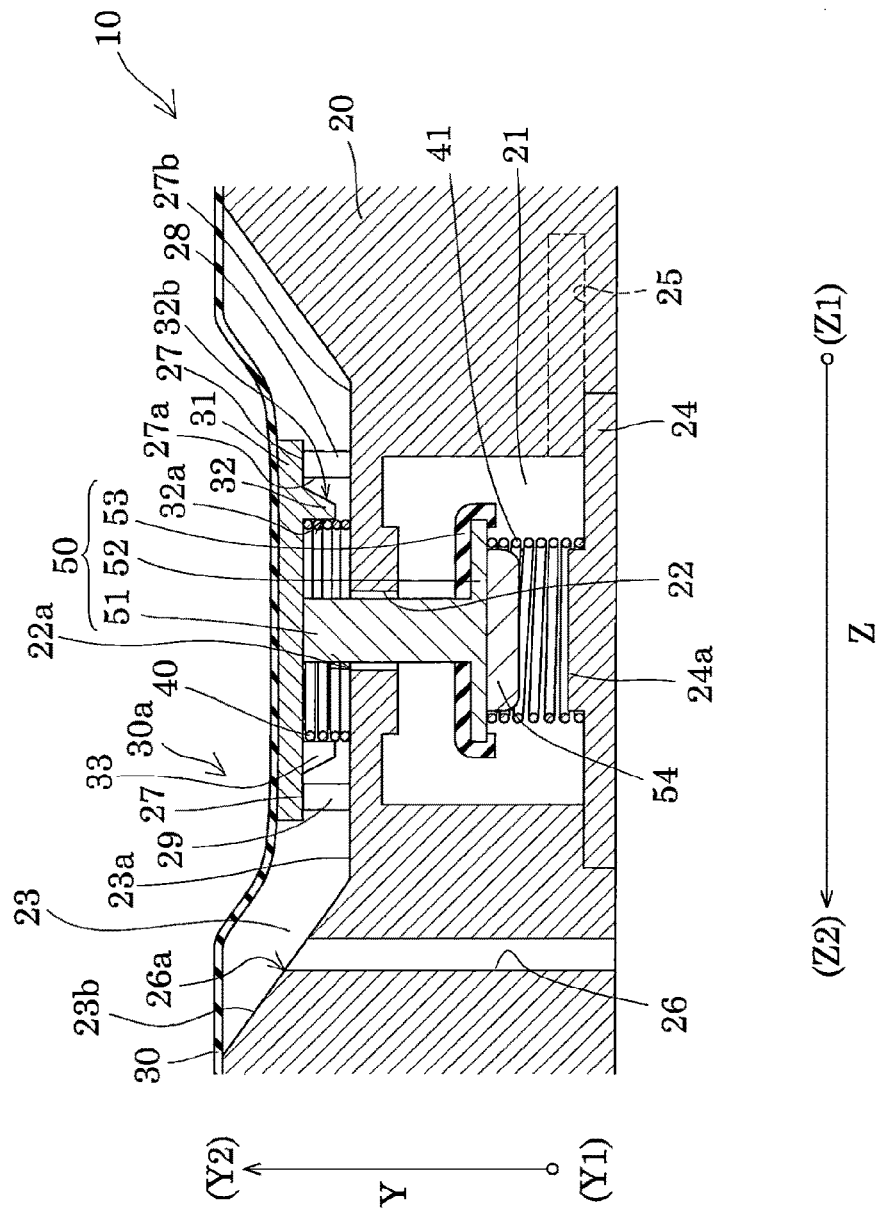
FIG. 4 is a sectional view of the valve device according to Exemplary Embodiment 1 of the invention.
Figure 5:
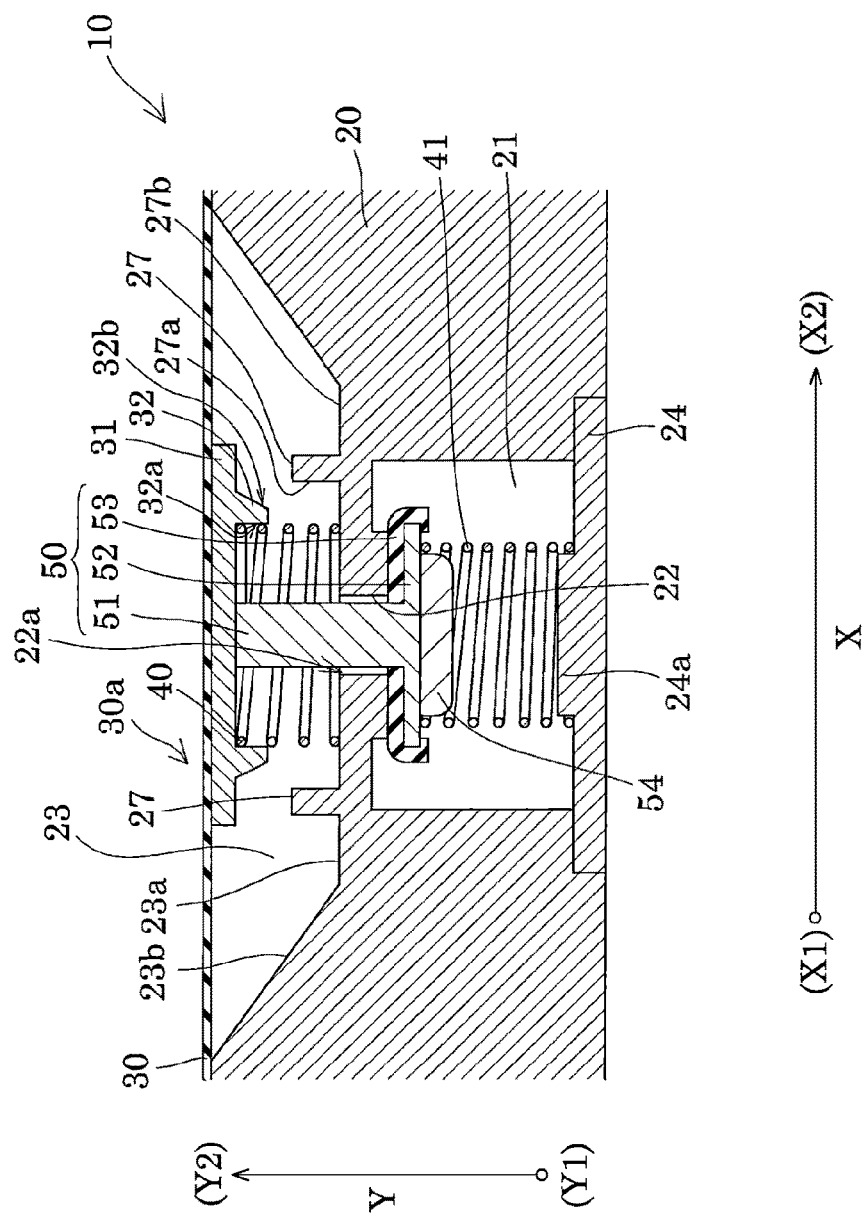
FIG. 5 is a sectional view of the valve device according to Exemplary Embodiment 1 of the invention.
Figure 6:
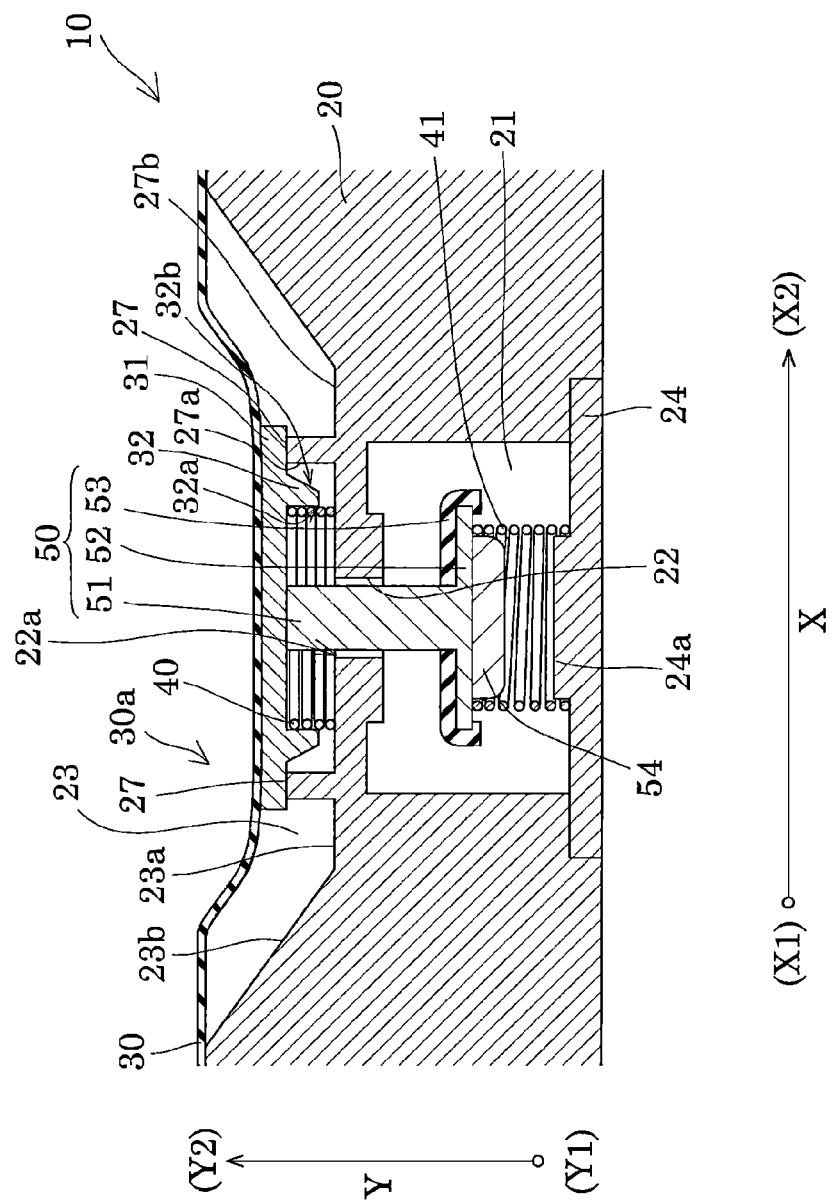
FIG. 6 is a sectional view of the valve device according to Exemplary Embodiment 1 of the invention.
Figure 7:
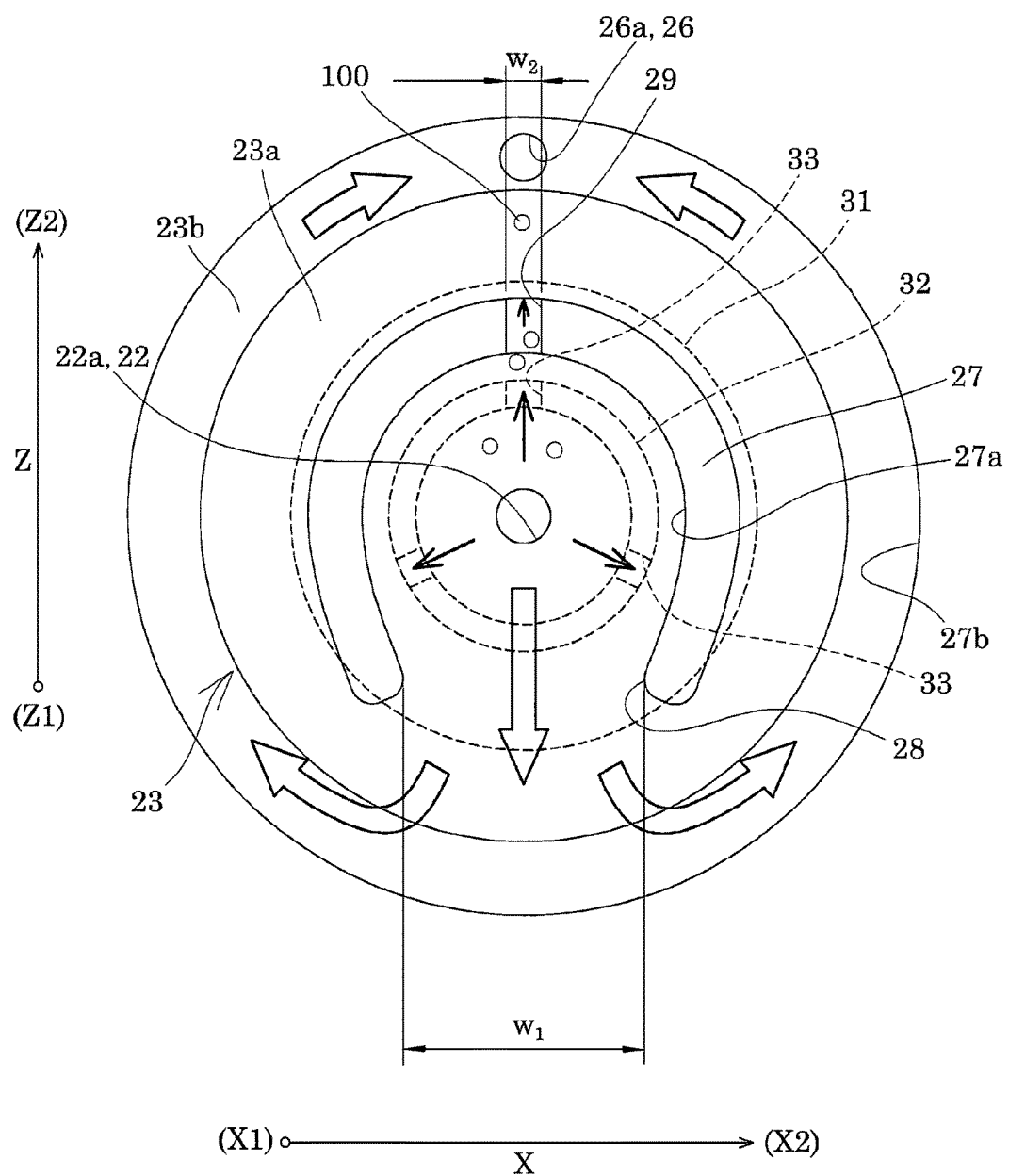
FIG. 7 is a diagram illustrating portions of the valve device according to Exemplary Embodiment 1 of the invention.

FIG. 1 is a perspective view of a valve device that is an example of a flow path member according to Exemplary Embodiment 1 of the invention. FIG. 2 is a plan view of the valve device. FIG. 3 and FIG. 4 are sectional views taken along line III, IV-III, IV of FIG. 2. FIG. 5 and FIG. 6 are sectional views taken along V, VI-V, VI of FIG. 2. FIG. 7 is a plan view illustrating a pressure regulation chamber of the valve device.

As illustrated in FIG. 1, a valve device 10 that is an example of a flow path member of this exemplary embodiment is provided on an intermediate portion of a flow path through which a liquid, such as ink, flows, and opens and closes the flow path. The valve device 10 includes a device body 20 and a flexible film 30 joined to a Y2-side surface of the device body 20 in the second direction Y by thermal welding, adhesive, etc. Note that the second direction Y, which is a stacking direction of the device body 20 and the film 30, corresponds to a first direction mentioned in the appended claims.

As illustrated in FIGS. 2 and 3, the device body 20 is provided with a housing chamber 21 that communicates with an upstream side of the flow path and a pressure regulation chamber 23 that communicates with the housing chamber 21 through a communication path 22 and also communicates with a downstream side of the flow path.

The housing chamber 21 is formed by sealing, with a lid member 24, a recess portion that has an opening in a Y1-side surface of the device body 20 in the second direction Y. The housing chamber 21 communicates with a first flow path 25 via one end of the first flow path 25. Another end of the first flow path 25 of which one end connects with the housing chamber 21 is connected with an upstream flow path (not depicted) via a tube or another kind of flow path member.

The pressure regulation chamber 23 is a recess portion that has a recess shape that has an opening on the Y2 side of the device body 20 in the second direction Y. In this exemplary embodiment, a bottom surface of the pressure regulation chamber 23, that is, a Y1-side surface thereof in the second direction Y, includes a first bottom surface 23a extending in the third direction Z and a second bottom surface 23b which surrounds a perimeter of the first bottom surface 23a and whose depth gradually decreases radially outwards. That is, the pressure regulation chamber 23 has a configuration whose depth in the second direction Y gradually decreases toward to an outer peripheral side.

A Y2-side surface of the device body 20 in which the pressure regulation chamber 23 has an opening is provided with a film 30 stuck thereto. The film 30 closes the opening of the pressure regulation chamber 23. A second flow path 26 has an opening in the bottom surface of the pressure regulation chamber 23. The opening of the second flow path 26 in the pressure regulation chamber 23 will be referred to as second opening 26a. In this exemplary embodiment, the second opening 26a is formed in the second bottom surface 23b. The second bottom surface 23b formed as an inclined surface and the second opening 26a formed in the second bottom surface 23b can reduce regions that cause flows of the liquid in peripheral directions of the pressure regulation chamber 23 along a perimeter of the pressure regulation chamber 23 to stagnate. Note that, if a pressure regulation chamber 23 is provided with only a first bottom surface 23a without a second bottom surface 23b, the liquid stagnates in a corner portion formed by the first bottom surface 23a and an inner peripheral wall of o the pressure regulation chamber 23, resulting in defective conditions such as residence of a component contained in the liquid or gas bubbles.

Another end of the second flow path 26 whose one end connects with the pressure regulation chamber 23 is connected with a flow path of a member, such as a head body, that is supplied with the liquid from the valve device 10.

The film 30 may be made of a flexible material that has resistance to the liquid. It is preferable that the film 30 be made of a material that is low in moisture permeability and the gas permeability to oxygen, nitrogen, etc. Examples of a material of the film 30 include a adhered laminate configuration obtained by adhering a high-density polyethylene film or a polypropylene (PP) film to a nylon film coated with vinylidene chloride (Saran®). Other materials, such as polyethylene terephthalate (PET), may also be used. A joining method for the film 30 is not limited to thermal welding but may also be vibration welding or use of an adhesive.

A portion of the film 30 which constitutes a portion of the wall surface of the pressure regulation chamber 23 serves as a diaphragm 30a. In this exemplary embodiment, the opening of the pressure regulation chamber 23 is circular and, therefore, the diaphragm 30a sealing the opening of the pressure regulation chamber 23 is also circular.

A Y1-side surface of the diaphragm 30a, that is, a pressure regulation chamber 23-side surface thereof, is provided with a pressure receiving plate 31. The pressure receiving plate 31 has a circular disc shape whose outside diameter is smaller than that of the diaphragm 30a, and is stuck to a substantially central position on the Y1-side surface of the diaphragm 30a. The adhesion method for the pressure receiving plate 31 and the film 30 is not particularly limited but may be thermal welding, vibration welding, use of an adhesive, etc. The pressure receiving plate 31 is provided in order to avoid direct contact between the film 30 and the valve body 50 that opens and closes the communication path 22. The pressure receiving plate 31 may be made of a material having higher rigidity than the diaphragm 30a, for example, a resin, a metal, etc.

The pressure receiving plate 31 is provided with a spring retainer 32 that receives and supports a second spring 40 (described in detail later) that is a coil spring. The spring retainer 32 is a circularly annular protrusion on a pressure regulation chamber 23-side surface of the pressure receiving plate 31 and houses therein an end portion of the second spring 40.

The spring retainer 32 has a surface 32a facing in radial directions of the second spring 40 in a plan view in the second direction Y. That is, the inner peripheral-side surface 32a of the spring retainer 32 contacts the second spring 40. In this exemplary embodiment, the surface 32a that the second spring 40 contacts is formed along the second direction Y.

On the other hand, an opposite-side surface 32b of the spring retainer 32 to the second spring 40 in a radial direction of the second spring 40, that is, an outer side surface 32b of the spring retainer 32 in a plan view in the second direction Y, is an oblique surface inclined with respect to the second direction Y. In other words, the spring retainer 32 is protruded in the second direction Y, which coincides with an operating direction of the second spring 40, and the amount of protrusion of the spring retainer 32 in the second direction Y from the pressure regulation chamber 23-side surface of the pressure receiving plate 31 gradually decreases with the increasing distance from the second spring 40 in its radial directions. The outer side surface 32b of the spring retainer 32 which is inclined as described above reduces stagnation of the flow of the liquid on outer sides of the spring retainer 32. That is, gas bubbles can be considerably prevented from being caught on the outer side of the spring retainer 32.

Furthermore, the pressure receiving plate 31 is provided with grooves 33 that divide the spring retainer 32. It suffices that when viewed in the second direction Y, a groove 33 is provided, at least, at a side of a first opening 22a that is an opening of the communication path 22, that is, a side that faces a second slit 29 (described in detail later), which is a Z2 side in this exemplary embodiment. In this exemplary embodiment, a total of three grooves 33 are provided, with one at the Z2 side in the third direction Z and one at each of an X1 side and an X2 side that are also a Z1 side. Because the spring retainer 32 is provided with the grooves 33 in this manner, the gas bubbles that are contained in the liquid supplied into the spring retainer 32 from the communication path 22 and that ascend to the Z2 side by buoyancy can the outside of the spring retainer 32 by passing through the grooves 33 and then can be emitted through the second slit 29. That is, gas bubbles can be considerably prevented from being caught inside the spring retainer 32.

The first bottom surface 23a of the pressure regulation chamber 23 has an opening of the communication path 22 that extends through the device body 20 in the second direction Y and that provides communication between the pressure regulation chamber 23 and the housing chamber 21. Via this communication path 22, the ink in the housing chamber 21 is supplied to the pressure regulation chamber 23. That is, in this exemplary embodiment, the opening of the communication path 22 to the pressure regulation chamber 23 is the first opening 22a that is used to supply the liquid. The communication path 22 as described above faces substantially a center of the pressure regulation chamber 23, that is, a center of the pressure receiving plate 31.

A valve body 50 is inserted through the communication path 22. The valve body 50 includes a shaft portion 51 extending through the communication path 22, a flange portion 52 provided on an end portion of the shaft portion 51 which is located inside the housing chamber 21, and a seal member 53 fitted to the flange portion 52.

The shaft portion 51 has an outside diameter that is slightly smaller than an inside diameter of the communication path 22. An e end portion of the shaft portion 51 which is located inside the pressure regulation chamber 23 is in contact with a central portion of the pressure receiving plate 31. Another end portion of the shaft portion 51 which is on a side opposite to the end thereof in contact with the pressure receiving plate 31 is located within the housing chamber 21. The another end portion of the housing chamber 21 is formed integrally together with the flange portion 52.

The flange portion 52 is made up of a circular platy member. The seal member 53 is fitted to the flange portion 52. The seal member 53 is made of a rubber, an elastomer, etc., and has a dome shape whose center portion has a through hole. The seal member 53 is fitted to the flange portion 52 so that the shaft portion 51 extends through the through hole of the seal member 53.

A first spring 41 that is a coil spring is interposed between the flange portion 52 of the valve body 50 and the lid member 24 that partially defines the housing chamber 21. Due to the springy force of the first spring 41, the valve body 50 is urged to the pressure regulation chamber 23 in a movement axis direction of the valve body 50 which is an axis direction of the shaft portion 51 and concedes with the second direction Y. The first spring 41 is held by fitting the first spring 41 to a first protrusion portion 54 provided on the opposite side surface of the flange portion 52 to the shaft portion 51 and to a second protrusion portion 24a provided on the lid member 24. As the first spring 41 urges the flange portion 52 to the communication path 22 side, that is, from the Y1 side to the Y2 side, the seal member 53 contacts an opening edge portion of the communication path 22 and therefore closes the opening of the communication path 22, thus establishing a closed valve state.

A second spring 40 that is a coil spring is interposed between the pressure receiving plate 31 within the pressure regulation chamber 23 and the bottom surface of the pressure regulation chamber 23 which faces the pressure receiving plate 31. The second spring 40 is around an outer periphery of the shaft portion 51 and urges the pressure receiving plate 31 to the side opposite to the bottom surface of the pressure regulation chamber 23, that is, from the Y1 side to the Y2 side.

The forces that acts on the valve body 50 includes a counter force from the film 30, a force that act on the pressure receiving plate 31 and the diaphragm 30a due to the liquid pressure in the pressure regulation chamber 23, the springy force of the first spring 41, the springy force of the second spring 40, and a force that acts on the valve body 50 due to the liquid supply pressure.

The counter force of the film 30 is a force by which the diaphragm 30a, when flexurally deformed, tends to return to its original shape. The larger the amount of deformation of the diaphragm 30a, that is, the larger the amount of flexion thereof, the larger the counter force of the film 30 becomes. The counter force of the film 30 as described above is transmitted to the shaft portion 51 via the pressure receiving plate 31.

The force that acts on the pressure receiving plate 31 and the diaphragm 30a due to the liquid pressure in the pressure regulation chamber 23 is represented by the product of the liquid pressure and a pressure receiving area of the pressure receiving plate 31 and the diaphragm 30a which receives the liquid pressure. When the liquid is caused to flow downstream out of the pressure regulation chamber 23 through the second opening 26a and the amount of the liquid in the pressure regulation chamber 23 decreases, the pressure difference between the liquid pressure and the atmospheric pressure increases and therefore the force that acts on the pressure receiving plate 31 and the diaphragm 30a increases. The force that acts on the pressure receiving plate 31 and the diaphragm 30a acts on the valve body 50, via the shaft portion 51, as a force to move the valve body 50 in a valve opening direction, that is, from Y2 to Y1.

The urging force of the first spring 41 is a force that urges the valve body 50 in a direction from Y1 to Y2 that is a valve closing direction. The urging force of the second spring 40 is a force that presses the pressure receiving plate 31 to an atmosphere side that is the Y2 side, that is, a force in the direction from Y1 to Y2 that is the valve closing direction. Thus, in this exemplary embodiment, since the valve body 50, due to the first spring 41 and the second spring 40, gives the pressure receiving plate 31 a force in the direction opposite to the direction of the force that is exerted on the pressure receiving plate 31 and the diaphragm 30a by the pressure or the liquid in the pressure regulation chamber 23, the pressure of the liquid in the pressure regulation chamber 23 needs to be reduced to a pressure that is lower by an amount that corresponds to the urging force of the first spring 41 and the second spring 40 (operation pressure). Thus, in this exemplary embodiment, since a spring for setting an operation pressure is divided into the first spring 41 and the second spring 40 that are housed separately in the housing chamber 21 and the pressure regulation chamber 23, respectively, the valve device 10 can be made thinner in comparison with a configuration in which such a spring is housed in only one of the housing chamber 21 and the pressure regulation chamber 23.

In the above-described valve device 10, as the liquid is caused to flow downstream out of the pressure regulation chamber 23 and therefore the pressure inside the pressure regulation chamber 23 decreases to a pressure below the atmospheric pressure as illustrated in FIGS. 4 and 6, the diaphragm 30a moves toward the bottom surface of the pressure regulation chamber 23, with the pressure receiving plate 31 pushing the valve body 50 to the Y1 side, while overcoming the urging force of the first spring 41 and the second spring 40, so that a clearance is formed between the seal member 53 of the valve body 50 and the opening edge portion of the communication path 22. Thus, the communication path 22 is opened, that is, the open valve state is established. Furthermore, as this open valve state causes the ink to be supplied from the housing chamber 21 into the pressure regulation chamber 23 so that the reduced pressure (negative pressure) in the pressure regulation chamber 23 disappears, the diaphragm 30a returns to its original position due to the urging force of the first spring 41 and the second spring 40, establishing a closed valve state, as illustrated in FIGS. 3 and 5.

In this valve device 10, the bottom surface of the pressure regulation chamber 23 is provided with an opening of an end of the second flow path 26 for conveying the liquid from the pressure regulation chamber 23 to a downstream flow path. In this exemplary embodiment, the opening of the second flow path 26 to the pressure regulation chamber 23 is referred to as the second opening 26a. In this exemplary embodiment, the second opening 26a is provided at the Z2 side in the third direction Z within the pressure regulation chamber 23. Note that in this exemplary embodiment, the vertical direction is the third direction Z, with the vertically lower side being the Z1 side and the vertically upper side being the Z2 side. Therefore, an arrangement is made such that the planar directions of the film 30 include the third direction Z, which is the vertical direction. The second opening 26a is disposed in an upper-side end portion of the pressure regulation chamber 23 in the vertical direction, that is, a Z2-side end portion thereof in the third direction Z. Due to this, even when a bubble in the pressure regulation chamber 23 moves upward in the vertical direction by buoyancy, the bubble can be certainly emitted through the second opening 26a. Furthermore, in an initial filling in which the liquid is filled into the pressure regulation chamber 23 for the first time, gas in the pressure regulation chamber 23 can be emitted through the second opening 26a to reduce the amount of gas and bubbles remaining in the pressure regulation chamber 23. Note that the initial filling can be carried out by, for example, suctioning gas and liquid from the second flow path 26 side while a portion that communicates with the first flow path 25 that supplies the liquid to the valve device 10 is closed (choked). The amount of gas that remains in the pressure regulation chamber 23 when the choking at the time of the initial filling is released is determined by the location of the second opening 26a in the vertical direction. Specifically, the amount of gas that remains in the pressure regulation chamber 23 at the time of initial filling can be made less the higher the location of the second opening 26a in the pressure regulation chamber 23 in the vertical direction.

Note that if the second opening 26a is located at the lower side in the vertical direction, gas remains at the vertically upper side of the second opening 26a at the time of initial filling and the remaining gas does not descend to the second opening 26a due to buoyancy, so that the capacity of the pressure regulation chamber 23 to house liquid becomes smaller and the behavior of the diaphragm 30a changes. If a bubble remains in the pressure regulation chamber 23, there arises a risk that the bubble may flow to the downstream side at an unexpected timing and cause a defective condition. Furthermore, since bubbles contained in the liquid and gas having passed through the film 30 reside at the vertically upper side due to buoyancy, bubbles grow and become relatively difficult to emit through the second opening 26a. Although such bubbles can be emitted, for example, by performing a cleaning operation of suctioning the liquid together with the bubbles through the second flow path 26, a sufficient cleaning operation will require an increased amount of the liquid to be suctioned. In this exemplary embodiment, since the second opening 26a is disposed in a vertically upper end portion of the pressure regulation chamber 23, the amount of gas that remains despite initial filling can be reduced and, furthermore, bubbles contained in the liquid in the pressure regulation chamber 23 and gas having entered the pressure regulation chamber 23 through the film 30 can be easily emitted. Thus, the consumption of the liquid needed in order to emit bubbles can be reduced. Note that if the second opening 26a is disposed, at least, at the vertically upper side of the communication path 22, residence of gas or bubbles can be inhibited.

As illustrated in FIGS. 3 and 5, a wall 27 is provided on the bottom surface of the pressure regulation chamber 23, that is, the first bottom surface 23a in this exemplary embodiment. The wall 27 is provided on a wall surface of the pressure regulation chamber 23 which faces the diaphragm 30a, and is protruded to the diaphragm 30a side, that is, to the Z2 side from the Z1 side.

In a plan view in the second direction Y as in FIG. 7, the wall 27 is provided at a location apart from a peripheral wall of the pressure regulation chamber 23, that is, a location apart inwardly from an outer periphery-side end portion of the second bottom surface 23b, specifically, on the first bottom surface 23a in this exemplary embodiment so as to surround a perimeter of the first opening 22a of the communication path 22. In other words, there are provided a first recess portion 27a whose bottom surface defines an opening edge of the first opening 22a of the communication path 22 and a second recess portion 27b which continuously extends around a perimeter of the first recess portion 27a and whose bottom surface defines an opening edge of the second opening 26a of the second flow path, and the wall 27 separates the first recess portion 27a and the second recess portion 27b from each other. That is, the pressure regulation chamber 23 can be said to be made up of the first recess portion 27a and the second recess portion 27b.

In a plan view in the second direction Y, one of two portions of the wall 27 across the first opening 22a from each other has a first slit 28 and the other portion has a second slit 29. The first slit 28 and the second slit 29 each provide communication between the first recess portion 27a on the inner side of the wall 27 and the second recess portion 27b on the outer side of the wall 27. In this exemplary embodiment, each of the first slit 28 and the second slit 29 is formed by moving a portion of the wall 27 completely in the second direction Y, that is, has a depth equal to the height of the wall 27 in the second direction Y.

Note that the description of the first slit 28 and the second slit 29 being provided across the first opening 22a from each other means that, in a plan view in the second direction Y, of two areas divided by a line passing through the center of the first opening 22a, one area is provided with the first slit 28 and the other area is provided with the second slit 29. That is, what is meant by the foregoing description is not limited to arrangements in which, in a plan view in the second direction Y, the first slit 28, the first opening 22a, and the second slit 29 are disposed on a straight line, but also includes arrangements in which a line connecting the first opening 22a and the first slit 28 and a line connecting the first opening 22a and the second slit 29 form an obtuse angle. In this exemplary embodiment, the first slit 28 and the second slit 29 are disposed at locations symmetrical about the first opening 22a, that is, disposed so that the first slit 28, the first opening 22a, and the second slit 29 are on a straight line. The wall 27 is formed around the first opening 22a so as to have an annular shape that is made discontinuous by the first slit 28 and the second slit 29. In this exemplary embodiment, the wall 27, in a plan view in the second direction Y, has basically a so-called horseshoe shape in which a circularly annular portion and portions extending from the circularly annular portion to the Z1 side are formed integrally with each other, and is discontinuous due to the first slit 28 and the second slit 29.

Furthermore, in this exemplary embodiment, the first slit 28 is provided at the opposite side of the first opening 22a to the second opening 26a, and the second slit 29 is provided at a second opening 26a side of the first opening 22a. Further, in this exemplary embodiment, since the second opening 26a is provided outside the wall 27 and at the Z2 side of the wall 27 in the third direction Z, which is the vertically upper side of the wall 27, the first slit 28 is provided at a vertically lower side of the first opening 22a, that is, the Z1 side of the first opening 22a in the third direction Z, and the second slit 29 is provided at a vertically upper side of the first opening 22a, that is, the Z2 side of the first opening 22a in the third direction Z.

The opening area of the first slit 28 is larger than the opening area of the second slit 29. In this exemplary embodiment, since the first slit 28 and the second slit 29 have the same depth in the second direction Y as illustrated in FIG. 3, the opening area of the first slit 28 is made larger than the opening area of the second slit 29 by making the opening width $w_1$ of the first slit 28 larger than the opening width $w_2$ of the second slit 29 ($w_1 > w_2$) as illustrated in FIG. 7.

The wall 27, in a plan view in the second direction Y, extends less than 360 degrees about the center of the first opening 22a. It is preferable that the wall 27 extend 180 degrees or more about the center of the first opening 22a. Due to this, although detailed in later, it is possible to effectively inhibit sedimentation of undesired matters contained in the liquid by reducing the region where the liquid resides when the first slit 28 forms flows of the liquid in the pressure regulation chamber 23.

As illustrated in FIGS. 4 and 6, the inside of the wall 27, that is, the first recess portion 27a, is formed to have an opening whose size is such that the spring retainer 32 of the pressure receiving plate 31 can be inserted into the opening. Therefore, when the diaphragm 30a flexurally deforms toward the bottom surface of the pressure regulation chamber 23, the spring retainer 32 is inserted into the first recess portion 27a. Furthermore, an outside diameter of the first recess portion 27a inside the wall 27 is smaller than an outside diameter of the pressure receiving plate 31, and an inside diameter of the second recess portion 27b outside the wall 27 is larger than the outside diameter of the pressure receiving plate 31. That is, the wall 27 has such a size as to reach beyond the outer periphery of the pressure receiving plate 31. Therefore, when the pressure receiving plate 31 moves to the wall 27, the pressure receiving plate 31 will certainly come into contact with the wall 27 even if the pressure receiving plate 31 shifts in any of the planar directions of the film 30 that includes the first direction X and the third direction Z.

Furthermore, the depth of the first recess portion 27a, that is, the height of the wall 27 in the second direction Y, is set so that the spring retainer 32 does not contact the bottom surface of the first recess portion 27a. Specifically, when the pressure receiving plate 31 is in contact with the wall 27 and the valve body 50 is in the open valve state, the spring retainer 32 of the pressure receiving plate 31, which is positioned within the first recess portion 27a during the open valve state, is apart from the first bottom surface 23a.

Furthermore, as illustrated in FIG. 7, corner portions of the wall 27 at the opening edge of the first slit 28 are rounded to have curved surfaces so that the corner portions of the wall 27 are inhibited from catching undesired matters or bubbles when the liquid flows from the first recess portion 27a into the second recess portion 27b through the first slit 28.

In this valve device 10, as the liquid flows out of the pressure regulation chamber 23 through the second opening 26a and the pressure in the pressure regulation chamber 23 reduces, the diaphragm 30a moves to the Y1 side and the pressure receiving plate 31 pushes the valve body 50 to the Y1 side, overcoming the urging force of the first spring 41 and the second spring 40.

In this process, when the reduction in the pressure of the liquid in the pressure regulation chamber 23 is small (the difference between the liquid pressure and the atmospheric pressure is small), the valve device 10 opens without contact between the pressure receiving plate 31 and the wall 27. When the reduction in the pressure of the liquid in the pressure regulation chamber 23 is great, that is, when the difference between the liquid and the atmospheric pressure is great, the pressure receiving plate 31 contacts the wall 27 as illustrated in FIGS. 4 and 6. That is, the wall 27 has a function of switching between the contact and non-contact states between the film 30 and the device body 20 as the film 30 is displaced relative to the wall 27.

When the pressure receiving plate 31 is in contact with the wall 27 as illustrated in FIGS. 4, 6 and 7, the liquid supplied through the first opening 22a of the communication path 22 flows from inside the spring retainer 32 into the first recess portion 27a inside the wall 27. In this exemplary embodiment, since a groove 33 is provided in a second slit 29-side portion of the spring retainer 32, that is, a Z2-side portion thereof that is a vertically upper portion thereof, flow of the liquid through the groove 33 caries bubbles into the first recess portion 27a. Even if bubbles contained in the liquid ascend by buoyancy against a flow of the liquid passing through the groove 33, at least one groove 33 provided on the Z2 side that is the vertically upper side forms a flow of the liquid moving in the same direction as the buoyant force acting on bubbles, so that residence of bubbles inside the spring retainer 32 can be inhibited.

The liquid supplied from the spring retainer 32 into the first recess portion 27a flows through a space between the spring retainer 32 and the wall 27 and is supplied into the second recess portion 27b outside the wall 27 through the first slit 28 and the second slit 29. The outer side surface 32b of the spring retainer 32, that is, the surface 32b that faces the wall 27, is an inclined surface, so as to inhibit the liquid from stagnating when the liquid flows along the circumferential directions of the surface 32b of the spring retainer 32. That is, if the surface 32b of the spring retainer 32 is along the second direction Y and therefore forms a corner, the corner is likely to cause the liquid to stagnate and therefore allow bubbles to reside and attach to an adjacent surface. However, in this exemplary embodiment, since the surface 32b is an inclined surface, stagnation of the liquid can be inhibited so that bubbles easily move.

Furthermore, since the opening area of the first slit 28 is larger than the opening area of the second slit 29, the liquid flowing from the first recess portion 27a to the second recess portion 27b passes more easily through the first slit 28, which has a lower flow resistance than the second slit 29. Therefore, as for the liquid flowing from the first recess portion 27a to the second recess portion 27b, the amount of flow through the first slit 28 is large and the amount of flow through the second slit 29 is small. Then, the liquid supplied into the second recess portion 27b through the first slit 28 flows through the second recess portion 27b along the outer periphery of the wall 27 to be emitted through the second opening 26a. That is, from the first recess portion 27a into the second recess portion 27b, the liquid is supplied to the Z1 side through the first slit 28 and then forms a flow along the second recess portion 27b from the Z1 side to the Z2 side, where the second opening 26a is provided. Therefore, the liquid is less likely to stagnate in the pressure regulation chamber 23, so that undesired matters or components contained in the liquid are less likely to sediment in the pressure regulation chamber 23. Even though undesired matters or components contained in the liquid sediment to the Z1 side by gravity, the flow through the first slit 28 stirs components contained in the liquid, so that sedimentation of undesired matters or components contained in the liquid can be inhibited.

In a configuration in which neither the wall 27 nor the first slit 28 is formed, the liquid supplied from the first opening 22a of the communication path 22 into the pressure regulation chamber 23 flows linearly in a relatively large amount toward the second opening 26a. Therefore, in this configuration, flow of the liquid from the first opening 22a to the Z1 side is unlikely to form, so that bubbles and undesired matters contained in the liquid and components contained in the liquid will reside on the Z1 side. Particularly, in a configuration, as in this exemplary embodiment, in which the third direction Z is set as the vertical direction and, taking a bubble emission characteristic into account, the second opening 26a is disposed at the Z2 side, that is, the upper side in the vertical direction, there occurs a region at the Z1 side, that is, the lower side in the vertical direction, in which the liquid resides, so that undesired matters and components contained in the liquid can sediment in large amounts at the vertically lower side in the pressure regulation chamber 23.

In this exemplary embodiment, since the first slit 28 with a low flow resistance forms a flow of the liquid toward a region in the pressure regulation chamber 23 in which undesired matters or components contained in the liquid are likely to reside, residence of the liquid at the side remote from the second opening 26a is inhibited, so that undesired matters or components contained in the liquid can be inhibited from sedimenting.

During a state in which the pressure receiving plate 31 is in contact with the wall 27, the liquid flows from the first recess portion 27a into the second recess portion 27b through the second slit 29. As illustrated in FIG. 7, a bubble 100 contained in the liquid supplied into the first recess portion 27a rises to the vertically upper side, that is, the Z2 side, by buoyancy. In this exemplary embodiment, since the second slit 29 is provided in a Z2-side portion of the wall 27, that is, a vertically upper side portion thereof, the direction of buoyant force acting on the bubble 100 and the direction of flow of the liquid through the second slit 29 can be made the same, so that the bubble 100 rising due to buoyancy can be moved into the second recess portion 27b through the second slit 29. That is, some bubbles 100 contained in the liquid move with a flow from the first recess portion 27a toward the second recess portion 27b, that is, to the Z1 side, through the first slit 28, and some other bubbles 100 experience buoyant forces that are greater than the forces exerted by the flow moving to the Z1 side and therefore ascend toward the Z2 side. The bubbles 100 moving with the flow to the Z1 side move to the second recess portion 27b through the first slit 28. On the other hand, the bubbles 100 rising to the Z2 side against the flow to the Z1 side move to the second recess portion 27b through the second slit 29. Thus, the provision of the second slit 29 make it possible to move the bubbles 100 contained in the liquid to the second recess portion 27b without allowing a bubble 100 to reside in the first recess portion 27a. Therefore, the bubble emission characteristic improves, so that changes in the behavior of the film 30 due to the presence of bubbles 100 or the growth of bubbles 100 is inhibited and therefore the film 30 can be stably operated. Furthermore, it is possible to inhibit a defective condition from being caused at the downstream side by a bubble 100 flowing to the downstream side at an expected timing after growing, for example, in an ink jet type recording head, occurrence of an incomplete discharge of ink due to bubbles. Still further, the number of times of performing the cleaning operation of expelling bubbles 100 together with the liquid in order to force out the bubbles 100 can be reduced to inhibit increases in the amount of undesirable consumption of the liquid.

It is preferable that a control be performed such that an open valve state in which the pressure receiving plate 31 is not in contact with the wall 27 and an open valve state in which the pressure receiving plate 31 is contact with the wall 27 as illustrated in FIGS. 4 and 6 can be selectively established.

For example, when the second flow path 26 side is suctioned while a portion that communicates with the first flow path 25 is closed (choked), establishment of the state in which the pressure receiving plate 31 is in contact with the wall 27 as illustrated in FIGS. 4 and 6 will form a flow of the liquid throughout the pressure regulation chamber 23 and will allow gas and the liquid and also sediments in the pressure regulation chamber 23 to be effectively expelled through the second opening 26a.

Note that the state as illustrated in FIGS. 4 and 6, although not particularly limited, allows, for example, the cleaning operation of emitting the liquid together with bubbles from the second flow path 26 side, the initial filling, etc. to be performed.

Furthermore, when the liquid is caused to flow from the pressure regulation chamber 23 to the downstream side without closing (choking) the portion that communicates with the first flow path 25, establishment of the open valve state in which the pressure receiving plate 31 is not in contact with the wall 27 will, although not particularly depicted, form a gap between the pressure receiving plate 31 and the wall 27, so that the liquid can be caused to flow toward the second opening 26a through this gap, separately from the first slit 28. Even if, at this time, the gap between the pressure receiving plate 31 and the wall 27 catch a bubble, the bubble leaves the gap and rises by buoyancy due to the impact caused when the pressure receiving plate 31 contacts the wall 27 as illustrated in FIGS. 4 and 6 or due to flow of the liquid or the like, so that the bubble will move from the second slit 29 to the second recess portion 27b. Thus, the bubble emission characteristic can be improved.

As described above, in this exemplary embodiment, the wall 27 is provided around the first opening 22a, the second opening 26a is provided outside the wall 27, the wall 27 has in two portions thereof across the first opening 22a from each other the first slit 28 and the second slit 29, respectively, and the first slit 28 has a larger opening area than the second slit 29. Therefore, such a control can be performed that a relatively large amount of the liquid is caused to flow through the first slit 28 of the wall 27 and a smaller amount of the liquid is caused to flow through the second slit 29 than through the first slit 28. Hence, the liquid is caused to flow through the entire interior of the pressure regulation chamber 23, which is a recess portion, via the first slit 28, and therefore produce stirring in the pressure regulation chamber 23 so as to reduce sedimentation of undesired matters and components contained in the liquid. Furthermore, since in addition to the first slit 28, the second slit 29 is provided, a passageway from the first recess portion 27a, which is inside the wall 27, to the second recess portion 27b, which is outside the wall 27, is added, so that bubbles contained in the liquid can be moved from the inside to the outside of the wall 27 or from outside to the inside of the wall 27. In particular, even when bubbles contained in the liquid move against the flow to the first slit 28 side, such bubbles can be emitted through the second slit 29, which is provided at the opposite side of the first opening 22a to the first slit 28, so that the bubble emission characteristic will improve.

Furthermore, in this exemplary embodiment, since the second opening 26a is provided at the Z2 side, that is, the vertically upper side, the bubble emission characteristic of the pressure regulation chamber 23, which is a recess portion, can be improved. Further, since the first slit 28 is provided at the Z1 side and the second slit 29 is provided at the Z2 side, sedimentation of undesired matters or components contained in the liquid at the Z1 side by gravity, if there is any such sediment, will be restrained as the flow of the liquid through the first slit 28 stirs the liquid. Further, if bubbles contained in the liquid rise to the Z2 side due to buoyancy, the flow of the liquid through the second slit 29 moves the bubbles from the first recess portion 27a inside the wall 27 to the second recess portion 27b outside the wall 27, so that the bubble emission characteristic will improve.

Furthermore, in this exemplary embodiment, as illustrated in FIGS. 4 and 6, since the pressure receiving plate 31 is movable to contact the wall 27, there is no need to stick the film 30 with high precision so as to form a flow path. That is, when the pressure receiving plate 31 is moved into contact with the wall 27, flows of the liquid passing through the first slit 28 and the second slit 29 are formed. Therefore, even if the precision in sticking the film 30 to the device body 20 is low so that the film 30 is wrinkled, the flows of the liquid through the first slit 28 and the second slit 29 are unlikely to be affected.

Furthermore, in this exemplary embodiment, the pressure receiving plate 31 is provided with the spring retainer 32 that receives the second spring 40, the surface 32a of the spring retainer 32 which is one of the two side surfaces facing in the radial directions of the second spring 40, that is, planar directions that include the first direction X and the third direction Z, is in contact with the second spring 40, and the other side surface 32b is an inclined surface. Providing the film 30 with the pressure receiving plate 31 in this manner can stabilize the posture of the film 30. Furthermore, since the pressure receiving plate 31 is provided with the spring retainer 32, the shifting of the second spring 40 can be inhibited and, at the same time, the breakage of the film 30 by the second spring 40 directly contacting the film 30 can be inhibited. Further, since the foregoing opposite-side, that is, outer-side, surface 32b of the spring retainer 32 is an inclined surface, the liquid does not easily stagnate on the surface 32b side of the spring retainer 32 and the bubble emission characteristic improves. In particular, when the wall 27 and the pressure receiving plate 31 are in contact with each other, the surface 32b, which is inclined, inhibits stagnation of flow of the liquid between the wall 27 and the spring retainer 32 and therefore inhibits bubbles in the liquid from residing inside the wall 27. Thus, the bubble emission characteristic improves.

Of course, the surface 32b of the spring retainer 32 is not limited to an inclined surface but may also be a surface extending in the second direction Y.

In this exemplary embodiment, the pressure receiving plate 31 is provided with the grooves 33 that divide the spring retainer 32, and at least one of the grooves 33 is provided at the second slit 29 side of the first opening 22a in a view taken in the second direction Y. Since at least one groove 33 is provided in this manner, the liquid supplied into the spring retainer 32 is supplied to the second slit 29 side through the at least one groove 33. Therefore, the bubbles contained in the liquid supplied into the spring retainer 32 can be moved to the outside of the wall 27 through the at least one groove 33 and the second slit 29.

Figure 8:
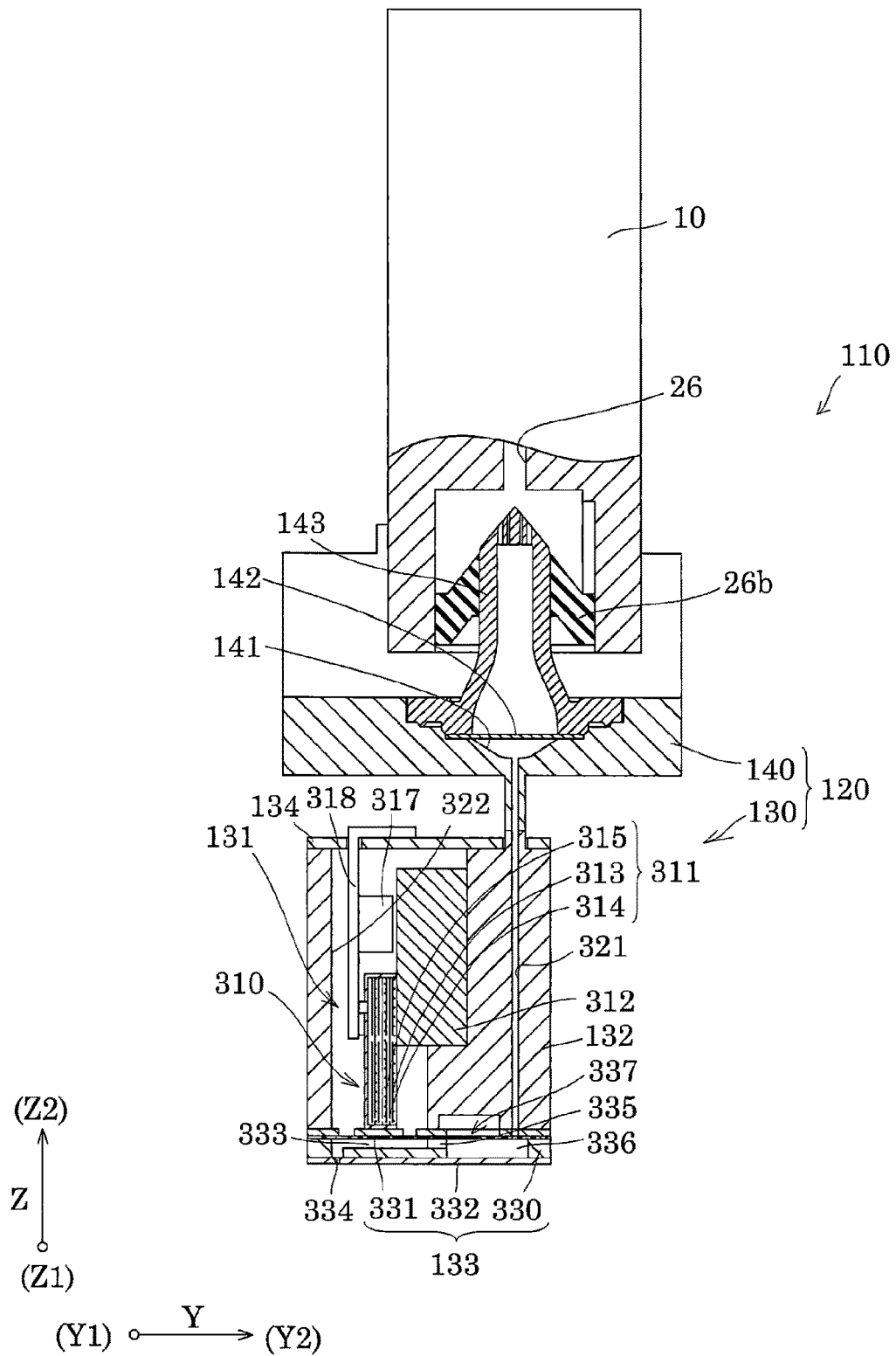
FIG. 8 is a sectional view of a recording head according to Exemplary Embodiment 1 of the invention.

The valve device 10 as described above is used in an ink jet type recording head that is an example of a liquid ejecting head that ejects liquid. An ink jet type recording head that is an example of a liquid ejecting head that includes the valve device of this exemplary embodiment will be described with reference to FIG. 8. FIG. 8 is a sectional view of portions of an ink jet type recording head.

As illustrated in FIG. 8, an ink jet type recording head (hereinafter, also referred to simply as recording head) 110 of this exemplary embodiment includes a valve device 10 that supplies an ink as a liquid and a head body 120 that ejects, in the form of ink droplets, the ink supplied from the valve device 10.

Furthermore, the head body 120 includes an ink discharger 130 that ejects ink droplets and a holder 140 that supplies the ink to the ink discharger 130.

The ink discharger 130 includes an actuator unit 131, a case 132 capable of housing therein the actuator unit 131, a flow path unit 133 joined to a one-side surface of the case 132, and a wiring substrate 134 fixed to another side surface of the case 132.

In this exemplary embodiment, the actuator unit 131 includes a piezoelectric actuator formation member 311 in which a plurality of piezoelectric actuators 310 are provided side by side in a side-by-side aligning direction of nozzle openings 334, and a fixture plate 312 to which the piezoelectric actuator formation member 311 is joined in such a manner that a distal end portion (one end portion) of the piezoelectric actuator formation member 311 is a free end portion and a proximal end portion (another end portion) thereof is a fixed end portion.

The piezoelectric actuator formation member 311 is formed by stacking a piezoelectric material 313 and electrode formation materials 314 and 315 in an alternate arrangement.

In this piezoelectric actuator formation member 311, a plurality of slits (not depicted) are formed by, for example, a wire saw or the like, and distal end portions thereof are cut off in the shape of comb teeth to form the piezoelectric actuators 310 that are disposed side by side. In this exemplary embodiment, the side-by-side direction of the piezoelectric actuators 310 is the same as the side-by-side direction of the nozzle openings 334. More specifically, the piezoelectric actuators 310 are disposed side by side so that the side-by-side direction thereof coincides with the first direction X when the piezoelectric actuator formation member 311 is mounted in the ink jet type recording apparatus 1 (described in detail later). Of course, the head body 120 does not need to be mounted in the ink jet type recording apparatus 1 so that the side-by-side direction of the nozzle openings 334 coincides with the first direction X, that is, this mounting is not particular restricted.

Note that a joining region of each piezoelectric actuator 310 to the fixture plate 312 is an inactive region that does not contribute to vibration and that when voltage is applied between the electrode formation materials 314 and 315 that constitute a piezoelectric actuator 310, only a distal end-side region of the piezoelectric actuator 310 that is not joined to the fixture plate 312 vibrates. A distal end surface of each piezoelectric actuator 310 is fixed to a vibration plate 331 (described later).

Each piezoelectric actuator 310 of the actuator unit 131 is connected to a circuit substrate 318, such as a chip-on-film (COF) substrate, on which a drive circuit 317, such as a drive integrated circuit (IC) for driving the piezoelectric actuators 310, is mounted.

The flow path unit 133 includes a flow path formation substrate 330, a vibration plate 331, and a nozzle plate 332.

The flow path formation substrate 330 is provided with a plurality of pressure generating chambers 333 disposed side by side. Two opposite sides of the flow path formation substrate 330 are sealed by the vibration plate 331 and the nozzle plate 332 that has nozzle openings 334 corresponding to the pressure generating chambers 333. Furthermore, the flow path formation substrate 330 is provided with a manifold 336 that is connected to each of the pressure generating chambers 333 via a corresponding one of ink supply paths 335 so as to serves as a common ink chamber for the plurality of pressure generating chambers 333.

Distal ends of the piezoelectric actuators 310 are fixed to regions of the vibration plate 331 that correspond to the pressure generating chambers 333.

A region in the vibration plate 331 which corresponds to the manifold 336 is provided with a compliance portion 337. Note that the compliance portion 337 functions to always keep the pressure in the manifold 336 constant by deforming to absorb a pressure change in manifold 336 when any such change occurs.

The case 132 is joined to the flow path unit 133 and is provided with an ink introduction path 321 that supplies the ink, that is, an liquid, from the valve device 10 to the manifold 336. The ink supplied from the valve device 10 into the ink introduction path 321 via the holder 140 is supplied to the manifold 336 and distributed to the pressure generating chambers 333 through the ink supply paths 335.

The case 132 is provided with a housing portion 322 corresponding to the pressure generating chambers 333. The actuator unit 131 is fixed within the housing portion 322.

The opposite side of the case 132 to the flow path unit 133 is provided with the wiring substrate 134. The circuit substrate 318 is connected at one of its ends to the actuator unit 131 and at the other end to the wiring substrate 134.

The ink discharger 130 as described above is configured so that deformation of a piezoelectric actuator 310 and a corresponding vibration plate 331 changes the capacity of a corresponding one of the pressure generating chambers 333 so that ink droplets are ejected from a corresponding one of the nozzle openings 334.

The holder 140, to whose Z2-side surface the valve device 10 is fixed, supplies the ink from the valve device 10 to the ink discharger 130, which is fixed to a Z1-side surface of the holder 140.

Concretely, the holder 140 includes an ink communication path 141, a filter 142 that is provided on an opening surface of the ink communication path 141 and that removes undesired matters, such as bubbles and dust, from the ink, and a supply needle 143 provided on the filter 142.

The supply needle 143 is inserted into the second flow path 26 of the valve device 10. The ink from the valve device 10 passes through an interior of the supply needle 143 and then through the filter 142, which removes undesired matters from the ink. After that, the ink is supplied to the ink discharger 130 through the ink communication path 141. Note that an interior of the second flow path 26 of the valve device 10 is provided with a connecting seal member 26b. The supply needle 143 of the holder 140 closely contacts the connecting seal member 26b so that a connecting portion between the supply needle 143 and the second flow path 26 is tightly sealed.

Although in this exemplary embodiment, the holder 140 and the valve device 10 are connected by the supply needle 143 that is provided in one of the holder 140 and the valve device 10 so as to be inserted into a flow path provided in the other one, the manner of connecting the holder 140 and the valve device 10 is not particularly limited so. For example, an opening of a flow path of one of the holder 140 and the valve device 10 may be provided with an absorber body that absorbs the liquid and an opening of a flow path of the other one may be provided with a filter. In this configuration, a liquid surface of the absorber body and a liquid surface of the filter are connected to connect the holder 140 and the valve device 10.

Figure 9:
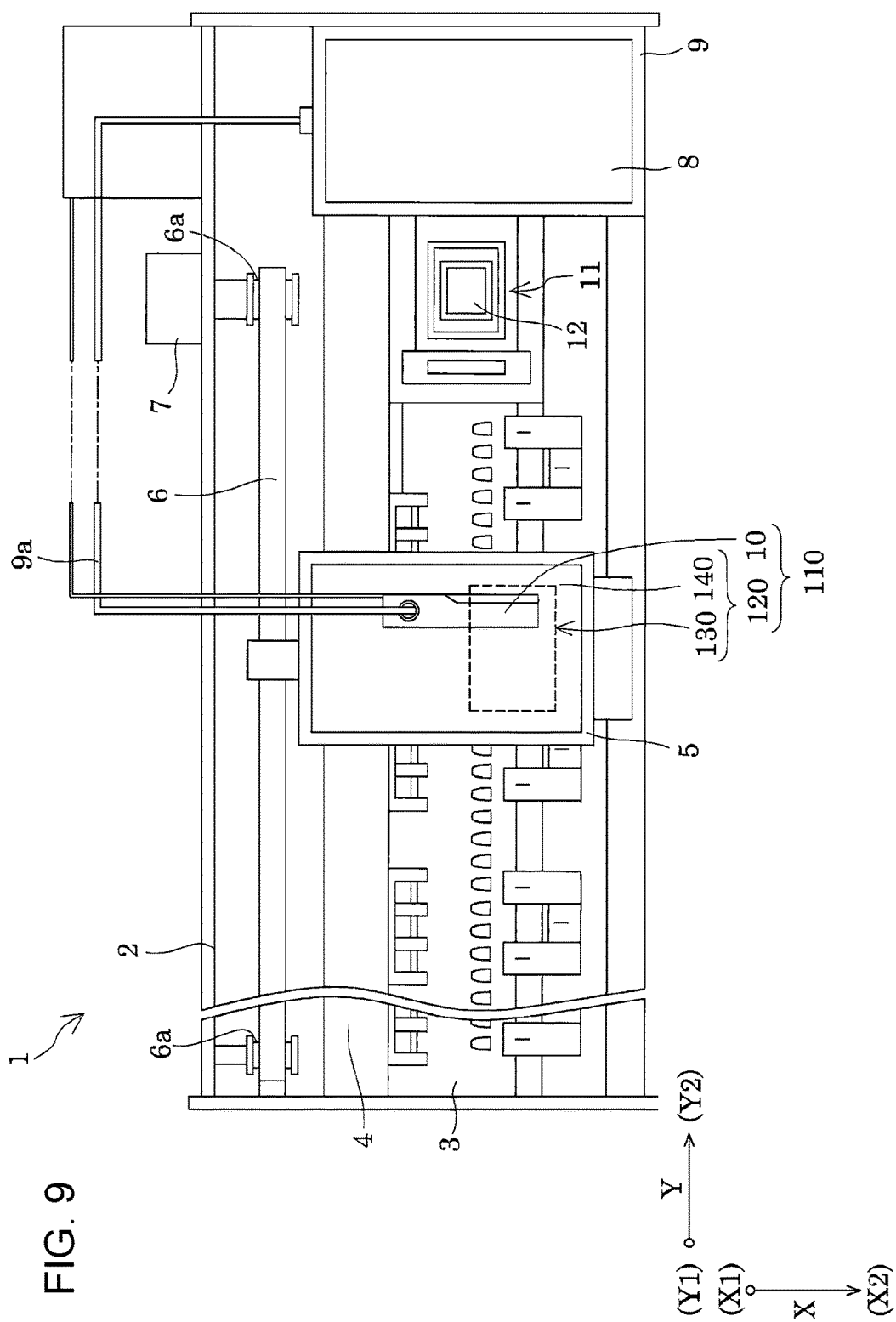
FIG. 9 is a plan view of a recording apparatus according Exemplary Embodiment 1 of the invention.

The recording head 110 as described above is used in an ink jet type recording apparatus. An example of a liquid ejecting apparatus according to this exemplary embodiment will be described with reference to FIG. 9. FIG. 9 is a plan view illustrating an ink jet type recording apparatus that is an example of the liquid ejecting apparatus according to Exemplary Embodiment 1 of the invention.

As illustrated in FIG. 9, an ink jet type recording apparatus 1 includes a body frame 2 that is an apparatus body according to this exemplary embodiment which has a rectangular shape in a plan view. In the body frame 2, a medium support member 3 that supports an ejection target medium (not depicted) extends in the second direction Y, which coincides with a main scanning direction. On the medium support member 3, an ejection target medium, such as paper, is fed and transported in the first direction X, which coincides with a subsidiary scanning direction and is orthogonal to the second direction Y, by a feeding mechanism (not depicted). Furthermore, in the body frame 2, a bar-shaped guide shaft 4 extends in the second direction Y, that is, parallel with the medium support member 3, above the medium support member 3.

A carriage 5 that holds the recording head 110 is supported on the guide shaft 4 so as to be movable back and forth in the second direction Y along the guide shaft 4. The carriage 5 is connected to a carriage motor 7 by an endless timing belt 6 that is wrapped around two pulleys 6a provided on the body frame 2. The carriage motor 7 is provided on the body frame 2 as well. Thus, the carriage 5 is moved back and forth along the guide shaft 4, driven by the carriage motor 7.

A tank holder 9 is provided on an end portion of the body frame 2 in the second direction Y. An ink tank 8 that is a liquid storage unit is detachably attached to the tank holder 9. In this exemplary embodiment, one ink tank 8 is provided. Of course, the number of ink tanks 8 is not particularly limited. That is, two or more ink tanks 8 may be provided.

The ink tank 8 attached to the tank holder 9 is connected to the valve device 10 of the recording head 110 via a supply pipe 9a in which a supply path is provided, for example, a tube. The valve device 10 is configured to temporarily store the ink supplied from the ink tank 8 via the supply pipe 9a, and the temporarily stored ink is supplied to the head body 120. In this exemplary embodiment, although not particularly depicted in the drawings, the tank holder 9 or an intermediate portion of the supply pipe 9a or the like is provided with a pumping unit that pumps the ink from the ink tank 8 toward the recording head 110. Examples of the pumping unit include a pressing unit that presses the ink tank 8 from outside, a pressurizing pump, etc. The pumping unit may also be a unit that utilizes a hydraulic head difference produced by adjusting the relative position between the recording head 110 and the ink tank 8 in the vertical direction.

A maintenance unit 11 for performing maintenance, such as the cleaning of the head body 120, is provided at a location in the body frame 2 which is relatively close to an end of the body frame 2 in the second direction Y and which is in a home position region of the carriage 5. The maintenance unit 11 includes a cap 12 that contacts the head body 120 so as to cover the nozzle openings of 334 of the head body 120 and that receives the ink discharged from the nozzle openings 334 by flushing, and a suction pump (not depicted) capable of suctioning an interior of the cap 12.

An arrangement is provided such as to perform a so-called cleaning operation in which the interior of the cap 12 placed in contact with the head body 120 and covering the nozzle openings 334 of the head body 120 is suctioned by a suction pump (not depicted) to force out the increased-viscosity ink, bubbles, etc. from the nozzle openings 334 into the cap 12.

In the ink jet type recording apparatus 1 as described above, while an ejection target medium is fed and transported in the first direction X, the carriage 5 is moved along the guide shaft 4 and the recording head 110 ejects the ink in the form of ink droplets, so that the ink droplets land on the ejection target medium. Printing is thus performed.

Exemplary Embodiment 2

Figure 10:
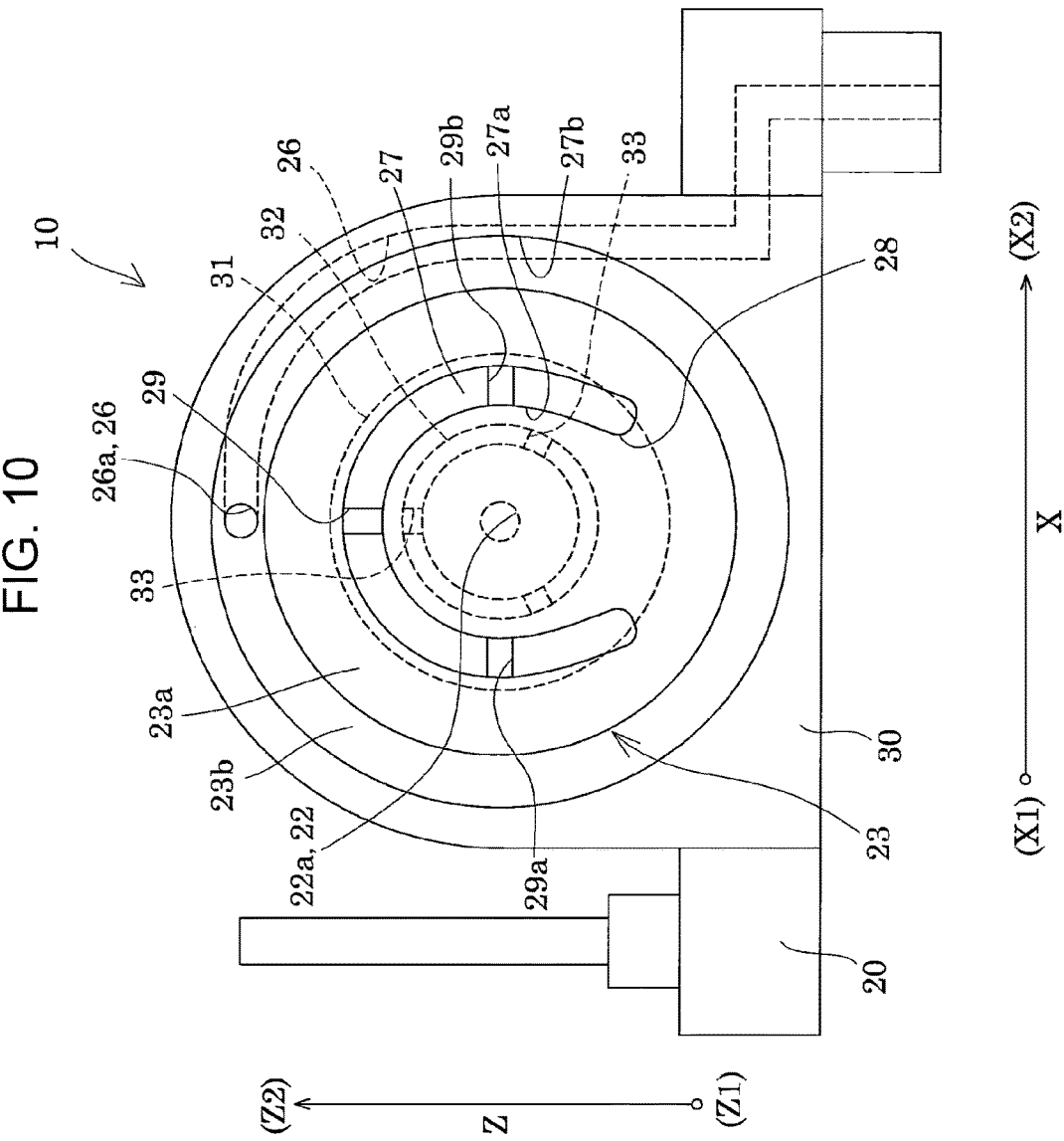
FIG. 10 is a diagram illustrating portions of a valve device according to Exemplary Embodiment 2 of the invention.

FIG. 10 is a plan view illustrating a pressure regulation chamber of a valve device that is an example of a flow path member according to Exemplary Embodiment 2 of the invention. Note that in the following description, substantially the same members and the like as in Exemplary Embodiment 1 are denoted by the same characters and redundant descriptions thereof are omitted.

As illustrated in FIG. 10, a pressure regulation chamber 23 is provided with a wall 27. A first recess portion 27a is provided inside the wall 27 and a second recess portion 27b is provided outside the wall 27.

The wall 27 is provided with a first slit 28 and a second slit 29 similar to the above-described first and second slits in Exemplary Embodiment 1. Furthermore, in the wall 27 in this exemplary embodiment, a plurality of slits are formed between the first slit 28 and the second slit 29. In this exemplary embodiment, a portion of the wall 27 which is located at the X1 side of a first opening 22a is provided with a third slit 29a, and a portion of the wall 27 which is located at the X2 side of the first opening 22a is provided with a fourth slit 29b. The third slit 29a and the fourth slit 29b each have a smaller opening area than the first slit 28. In this exemplary embodiment, the third slit 29a and the fourth slit 29b have the opening area as the second slit 29. The third slit 29a and the fourth slit 29b have the same depth in the second direction Y as the first slit 28 and the second slit 29. Therefore, in a plan view in the second direction Y, the third slit 29a and the fourth slit 29b have the same width as the second slit 29.

The provision of a plurality of slits, that is, the third slit 29a and the fourth slit 29b in this exemplary embodiment, between the first slit 28 and the second slit 29 in the wall 27 facilitates movement of bubbles from the first recess portion 27a into the second recess portion 27b and thus improves the bubble emission characteristic. In particular, even when bubbles are caught inside the wall 27, emission of the bubbles to the outside of the wall 27 can be promoted by the plurality of slits, so that the bubble emission characteristic can be improved.

Although in this exemplary embodiment, the third slit 29a and the fourth slit 29b are additionally provided, the number slits provided between the first slit 28 and the second slit 29 is not limited to two but may be one or three or more. Furthermore, although the locations of slits between the first slit 28 and the second slit 29 are not particularly limit, it is preferable that slits be equidistantly provided between the first slit 28 and the second slit 29.

Other Exemplary Embodiments

While the exemplary embodiments of the invention have been described above, a basic configuration of the invention is not limited by what have been described above.

For example, in the foregoing exemplary embodiments, the first slit 28 and the second slit 29 have the same depth in the second direction Y and the first slit 28 is given a larger opening width than the second slit 29, so that the first slit 28 has a larger opening area than the second slit 29. This does not limit the invention. For example, the first slit 28 and the second slit 29 may have different depths in the second direction Y. In any case, by making the opening area of the first slit 28 larger than the opening area of the second slit 29, a larger portion of the liquid supplied into the first opening 22a can be caused to pass through the first slit 28 than through the second slit 29, thereby inhibiting sedimentation of components contained in the liquid, or the like.

Although the valve device 10 is described above as a flow path member in conjunction with the foregoing exemplary embodiments, the flow path member is not limited to the valve device 10 but may also be, for example, a flow path member that is not provided with a valve body. Examples of such a flow path member include a flow path member that includes a filter chamber provided with a filter that traps undesired matters contained in ink, such as bubbles or dust. Specifically, the flow path member is not particularly limited as long as the flow path member includes a recess portion and a filter that closes an opening of the recess portion and the recess portion functions as a flow path.

Figure 11:
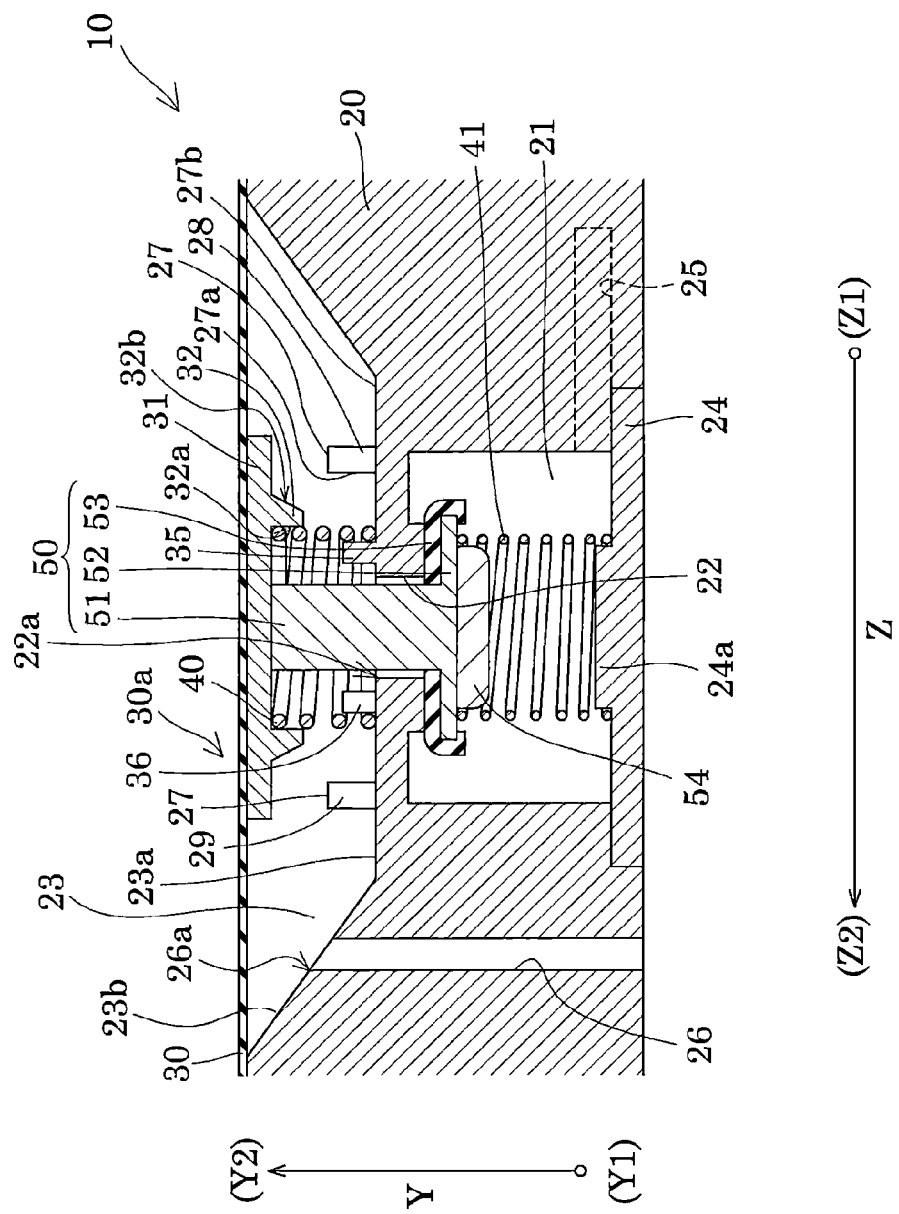
FIG. 11 is a sectional view of a valve device a further exemplary embodiment of the invention.

Furthermore, although in the foregoing exemplary embodiments, the film 30 is provided with the pressure receiving plate 31 and the pressure receiving plate 31 is provided with the spring retainer 32, this does not limit the invention. A modification of the spring retainer will be described with reference to FIG. 11. FIG. 11 is a sectional view illustrating a valve device according to another exemplary embodiment.

As illustrated in FIG. 11, a device body 20 of the valve device 10 is provided with a main body-side spring retainer 35 that is a spring retainer that receives a second spring 40. The main body-side spring retainer 35 is protruded from a surface of the device body 20 which faces a pressure receiving plate 31 toward the pressure receiving plate 31, that is, from the Y1 side to the Y2 side in the second direction Y. The main body-side spring retainer 35 has an outside diameter that is slightly smaller than an inside diameter of the second spring 40. Inside the main body-side spring retainer 35, a communication path 22 is provided.

By providing the device body 20 with the main body-side spring retainer 35 that holds the second spring 40, positional shifting of the second spring 40 relative to the device body 20 can be inhibited.

Furthermore, the main body-side spring retainer 35 is provided with main body-side grooves 36 that divide the main body-side spring retainer 35. It suffices that a main body-side groove 33 is provided, when viewed in the second direction Y, at least in a portion of the main body-side spring retainer 35 that is located at a second slit 29 side of a first opening 22a that is an opening of the communication path 22, for example, at the Z2 side of the first opening 22a in this exemplary embodiment. In this exemplary embodiment, although not particularly depicted, a total of three main body-side grooves 36 are formed on the main body-side spring retainer 35, similarly to the grooves 33 provided on the spring retainer 32 of the pressure receiving plate 31 in Exemplary Embodiment 1, that is, a main body-side groove 36 on a Z2-side portion of the main body-side spring retainer 35 in the third direction Z, and another main body-side groove 36 on a Z1-side portion to the X1 side, and the other main body-side groove 36 on a Z1-side portion to the X2 side. Since the device body 20 is provided with the main body-side grooves 36 in this manner, a gas bubble contained in the liquid supplied from the communication path 22 to the inside of the main body-side spring retainer 35, when rising to the Z2 side by buoyancy, can move to the outside of the main body-side spring retainer 35 via a main body-side groove 36 and then can be emitted through the second slit 29. That is, gas bubbles can be considerably prevented from being caught inside the spring retainer 32. Although in the example illustrated in FIG. 11, the spring retainer 32 of the pressure receiving plate 31 is not provided with a groove 33, this does not limit the invention. That is, the spring retainer 32 of the pressure receiving plate 31 may be provided with grooves 33 similar to those in Exemplary Embodiment 1. That is, it suffices that at least one of the pressure receiving plate 31 and the device body 20 has a spring retains and a groove that divides the spring retainer and that the groove is provided at the second slit 29 side of the first opening 22a when viewed in the first direction X.

Furthermore, although in Exemplary Embodiment 1, the valve device 10 is disposed so that the planar directions of the film 30 include the third direction Z, which is a vertical direction, this does not limit the invention. For example, the valve device 10 may be disposed so that the planar directions of the film 30 include horizontal directions perpendicular to the vertical direction, that is, the first direction X and the second direction Y. In this arrangement, too, residence of the liquid is reduced so that production of liquids having different components due to residence of the liquid can be inhibited and the bubble emission characteristic can be improved. Specifically, if residence of the liquid occurs, a residing portion of the liquid is not replaced by a fresh portion of the liquid, so that the components contained in that portion may alter in amount or proportion. Such residence of the liquid also occurs in a case where the valve device 10 is disposed so that the planar directions of the film 30 are horizontal directions perpendicular to the vertical direction. Therefore, the liquid can be inhibited from residing and can be stirred due to the provision of the first slit 28. Furthermore, even when the film 30 is horizontally disposed, the provision of the second slit 29 in addition to the first slit 28 adds a path between the first recess portion 27a inside the wall 27 and the second recess portion 27b outside the wall 27, so that gas bubbles contained in the liquid can be moved from the inside to the outside of the wall 27 or from the outside to the inside of the wall 27. In particular, even when a bubble contained in the liquid moves against a flow on the first slit 28, the bubble can be emitted through the second slit 29 that is provided across the first opening 22a from the first slit 28, that is, the opposite side of the first opening 22a to the first slit 28. Thus, the bubble emission characteristic can be improved.

Further, although in the foregoing exemplary embodiments, the liquid is supplied into the pressure regulation chamber 23 through the first opening 22a of the communication path 22 and the liquid in the pressure regulation chamber 23 is emitted into the second flow path 26 through the second opening 26a, this does not limit the invention. The liquid may be supplied into the pressure regulation chamber 23 through the second opening 26a of the second flow path 26 and the liquid in the pressure regulation chamber 23 may be emitted into the communication path 22 through the first opening 22a. That is, regardless of whether the liquid flows from the first recess portion 27a inside the wall 27 to the second recess portion 27b outside the wall 27 or from the second recess portion 27b outside the wall 27 to the first recess portion 27a inside the wall 27, the invention can be applied.

Furthermore, although in Exemplary Embodiments 1 and 2, both the first spring 41 and the second spring 40 are provided, this does not particularly limit the invention. It is permissible to provide only one of the first spring 41 and the second spring 40 as long as the valve body 50 can be urged to move to the Z2 side.

Further, although in Exemplary Embodiments 1 and 2, the pressure receiving plate 31 is provided with the spring retainer 32, this does not particularly limit the invention. The pressure receiving plate 31 does not need to be provided with the spring retainer 32, if the valve body 50 can be urged to the Z2 side by a spring. In a configuration in which the pressure receiving plate 31 is provided with the spring retainer 32, the pressure receiving plate 31 and the spring that urges the pressure receiving plate 31 can be stably connected. Furthermore, although the spring retainer 32 is provided with slits in the foregoing embodiments, the spring retainer does not need to be provided with a slit. During the open valve state, a sufficiently large space provided between the spring retainer 32 and the bottom surface of the pressure regulation chamber 23 will inhibit restriction on flow of the liquid from the communication path 22 to the outside of the spring retainer 32.

Although in the foregoing exemplary embodiments, the wall 27 in a plan view in the second direction Y has a shape that is axially symmetrical with respect to a center axis in the third direction Z, this does not particularly limit the invention. For example, wall 27 does not need to be axially symmetrical. Furthermore, although in the foregoing exemplary embodiment, the wall 27 in a plan view in the second direction Y has a so-called horseshoe shape formed by integrally combining a circular portion and portions extending from the circular portion to the Z1 side, this does not particularly limit the invention. For example, the wall 27 may have a circular shape.

Although in conjunction with the foregoing ink jet type recording apparatus 1, the recording head 110 that is mounted on the carriage 5 and movable in the main scanning direction that is the first direction X is illustrated as an example, this does not particularly limit the invention. For example, the invention can also be applied to a so-called line type recording apparatus in which a recording head 110 is fixed to a body frame 2 and printing is performed by merely moving an ejection target medium in the subsidiary scanning direction.

Further, although in conjunction with Exemplary Embodiment 1, the ink jet type recording apparatus 1 equipped with the recording head 110 that includes the valve device 10, which is a flow path member, is illustrated as an example, this does not particularly limit the invention. A flow path member represented by the valve device 10 according to the invention may be provided in a portion or the like other than the recording head 110 of the ink jet type recording apparatus 1. For example, in the case where the flow path member of the invention is a flow path member that includes a filter, the flow path member may be provided in the tank holder 9 or an intermediate portion of the supply pipe 9a.

Further, although in conjunction with the foregoing exemplary embodiments, the ink jet type recording apparatus 1 having a configuration in which the ink tank 8 that is a storage unit is fixed to the body frame 2 is illustrated as an example, this does not particularly limit the invention. For example, the ink jet type recording apparatus 1 may include a storage unit, such as an ink cartridge, that is mounted on the carriage 5 together with the recording head 110.

The invention has been made generally for liquid ejecting apparatuses that include a wide variety of liquid ejecting heads and is also applicable to, for example, liquid ejecting apparatuses that include recording heads, such as various ink jet type recording heads, for use in image recording apparatuses, such as printers, color material ejecting heads for use in producing color filters for liquid crystal displays and the like, electrode material ejecting heads for use in forming electrodes for organic electroluminescent (EL) displays, field emission displays (FEDs), etc., bioorganic material ejecting heads for use in producing biochips, etc.

Furthermore, the invention is not limited to a valve device that is mounted in a liquid ejecting apparatus but can be used generally in apparatuses that include flow paths.

CROSS-REFERENCE TO RELATED APPLICATIONS

This application claims priority to Japanese Patent Application No. 2017-045393 filed on Mar. 9, 2017. The entire disclosures of Japanese Patent Application No. 2017-045393 are hereby incorporated herein by reference.

What is claimed is:

1. A flow path member comprising:
a film;
a main body that includes a recess portion that is closed by the film;
a first opening and a second opening that are provided in the recess portion and that are used to supply and emit a liquid; and
a wall which is provided in the recess portion,
wherein the film and the wall are configured to switch between contact and non-contact between the film and the main body according as the film displaces,
wherein in a view taken in a first direction that is a stacking direction of the main body and the film, the wall is provided around the first opening, the wall has a first slit in one of two portions of the wall across the first opening from each other and a second slit in the other one of the two portions of the wall, and
the second opening is outside the wall, and
wherein an opening area of the first slit is larger than an opening area of the second slit.

2. The flow path member according to claim 1, further comprising
a pressure receiving plate that is fixed to the film and that includes a spring retainer,
wherein, of two substantially opposite side surfaces of the spring retainer in a radial direction of a spring that is held by the spring retainer, one side surface contacts the spring and the other side surface is an inclined surface.

3. The flow path member according to claim 2, further comprising
a pressure receiving plate that is fixed to the film,
wherein at least one of the pressure receiving plate and the main body has a spring retainer and a groove that divides the spring retainer, and
wherein in a view taken in the first direction, the groove is provided at a second slit side of the first opening.

4. The flow path member according to claim 3, wherein the wall has, between the first slit and the second slit in a view taken in the first direction, a slit that has a smaller opening area than the first slit.

5. A liquid ejecting head comprising the flow path member according to claim 2.

6. A liquid ejecting apparatus comprising the flow path member according to claim 2.

7. The flow path member according to claim 1, further comprising
a pressure receiving plate that is fixed to the film,
wherein at least one of the pressure receiving plate and the main body has a spring retainer and a groove that divides the spring retainer, and
wherein in a view taken in the first direction, the groove is provided at a second slit side of the first opening.

8. The flow path member according to claim 7, wherein the wall has, between the first slit and the second slit in a view taken in the first direction, a slit that has a smaller opening area than the first slit.

9. A liquid ejecting head comprising the flow path member according to claim 7.

10. A liquid ejecting apparatus comprising the flow path member according to claim 7.

11. The flow path member according to claim 1, wherein the wall has, between the first slit and the second slit in a view taken in the first direction, a slit that has a smaller opening area than the first slit.

12. A liquid ejecting head comprising the flow path member according to claim 11.

13. A liquid ejecting apparatus comprising the flow path member according to claim 11.

14. The flow path member according to claim 1, further comprising
a pressure receiving plate that is fixed to the film.

15. The flow path member according to claim 14, wherein the wall has, between the first slit and the second slit in a view taken in the first direction, a slit that has a smaller opening area than the first slit.

16. A liquid ejecting head comprising the flow path member according to claim 1.

17. A liquid ejecting apparatus comprising the flow path member according to claim 1.

* * * * *